United States Patent
Tomioka et al.

(10) Patent No.: US 6,517,199 B1
(45) Date of Patent: Feb. 11, 2003

(54) LIQUID COMPOSITION, INK SET, COLORED AREA FORMATION ON RECORDING MEDIUM, AND INK-JET RECORDING APPARATUS

(75) Inventors: Hiroshi Tomioka, Tokyo (JP); Yutaka Kurabayashi, Higashi Murayama (JP); Kentaro Yano, Yokohama (JP); Yuji Kondo, Machida (JP); Masao Kato, Utsunomiya (JP); Mitsuhiro Ono, Yokohama (JP); Makiko Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,568

(22) Filed: Nov. 9, 2000

(30) Foreign Application Priority Data

Nov. 12, 1999 (JP) .......... 11-323408
Nov. 12, 1999 (JP) .......... 11-323412
Nov. 12, 1999 (JP) .......... 11-323418

(51) Int. Cl.$^7$ .................... B41J 2/01
(52) U.S. Cl. .................... 347/101; 347/100
(58) Field of Search ................ 347/100, 101, 347/105, 99, 96

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 |
| 4,694,302 A | 9/1987 | Hackleman et al. | 346/1.1 |
| 4,723,129 A | 2/1988 | Endo et al. | 346/1.1 |
| 5,549,740 A * | 8/1996 | Takahashi et al. | 347/100 |
| 5,614,007 A | 3/1997 | Kurabayashi et al. | 106/22 R |
| 5,618,338 A * | 4/1997 | Kurabayashi et al. | 347/100 |
| 5,623,294 A | 4/1997 | Takizawa et al. | 347/98 |
| 5,624,484 A | 4/1997 | Takahashi et al. | 106/31.75 |
| 5,640,187 A | 6/1997 | Kashiwazaki et al. | 347/101 |
| 5,700,314 A | 12/1997 | Kurabayashi et al. | 106/31.27 |
| 5,792,249 A | 8/1998 | Shirota et al. | 106/31.27 |
| 5,985,975 A | 11/1999 | Kurabayashi et al. | 524/462 |
| 6,027,210 A | 2/2000 | Kurabayashi et al. | 347/100 |
| 6,238,045 B1 | 5/2001 | Ono et al. | 347/96 |

FOREIGN PATENT DOCUMENTS

| | | |
|---|---|---|
| EP | 0 675 178 A2 | 10/1995 |
| JP | 61-59911 B2 | 5/1979 |
| JP | 61-59912 B2 | 5/1979 |
| JP | 61-59914 B2 | 2/1980 |
| JP | 55-65269 | 5/1980 |
| JP | 55-66976 | 5/1980 |
| JP | 55-150396 | 11/1980 |
| JP | 63-22681 | 1/1988 |
| JP | 63-60783 | 3/1988 |
| JP | 63-299971 | 12/1988 |
| JP | 64-9279 | 1/1989 |
| JP | 64-63185 | 3/1989 |
| JP | 4-259590 | 9/1992 |
| JP | 6-92010 | 4/1994 |
| JP | 8-72393 | 3/1996 |
| JP | 8-224955 | 9/1996 |

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

The present invention relates to a liquid composition, an ink set employing the liquid compositions a method for forming a colored area of an image on a recording medium with the ink-set, and an ink-jet recording apparatus employing the ink set are provided, which enables formation of ink-jet record on a plain paper sheet with a broad color reproduction range, uniformity of the color, less stripy unevenness in a solid print part, and high rub-off resistance of the record. The liquid composition is stable in storage, and is ejected stably from the recording head.

The liquid composition is used for forming a colored area on a recording medium by application with an anionic or cationic aqueous ink containing a coloring material, and the liquid composition contains fine particles dispersed therein and the surface of the fine particles being electrically charged in a polarity opposite to the aqueous ink.

40 Claims, 9 Drawing Sheets

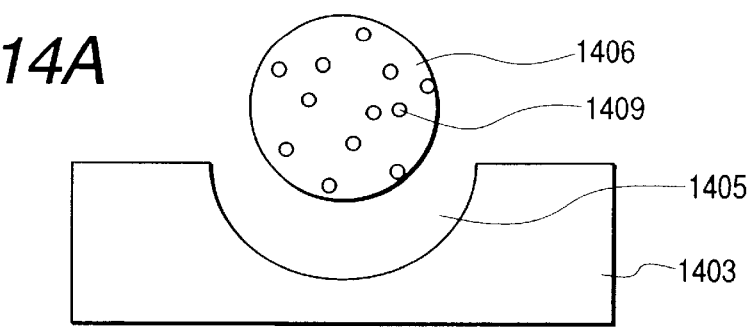
FIG. 14A
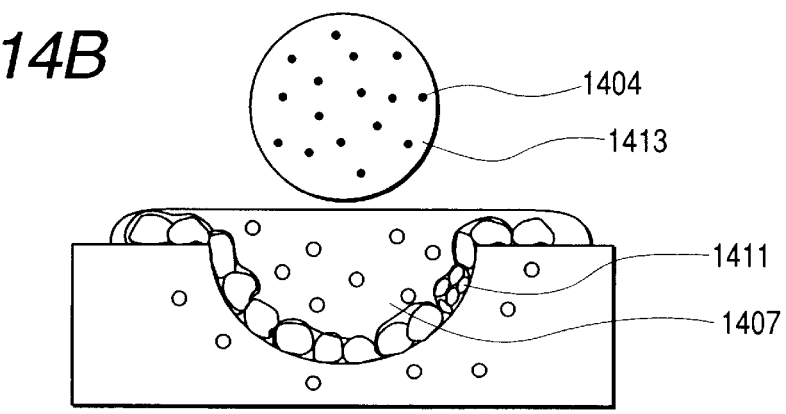
FIG. 14B
FIG. 14C 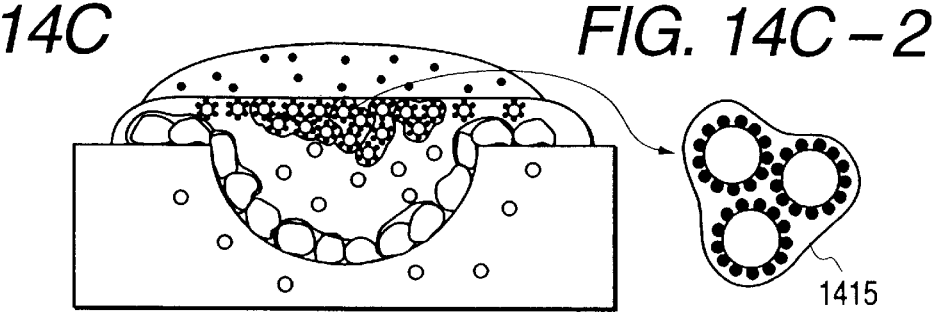 FIG. 14C-2
FIG. 14D
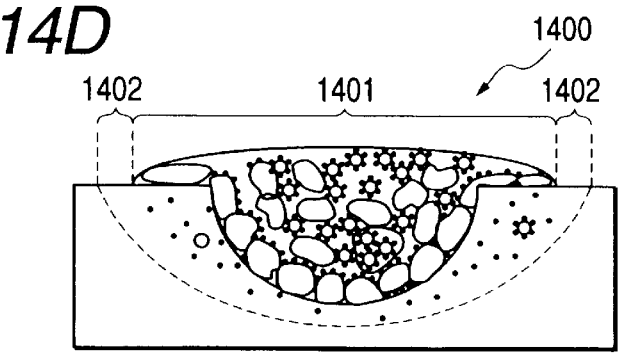

LIQUID COMPOSITION, INK SET, COLORED AREA FORMATION ON RECORDING MEDIUM, AND INK-JET RECORDING APPARATUS

BACKGROUND OF THE INVENTION

1. Field of the Invention

The present invention relates to a method for forming a color image with excellent coloring property (or color development) and color uniformity. Particularly, the present invention relates to a liquid composition and an ink set comprising the liquid composition suitable for image formation by an ink-jet recording system, a method for forming a colored portion on a recording medium; and an ink-jet recording apparatus employing the ink set.

2. Related Background Art

The ink-jet recording system conducts recording by ejecting an ink onto a recording medium like a paper sheet. For example, ink-jet recording systems which employ an electro-thermal transducer are disclosed in Japanese Patent Publication Nos. 61-59911, 61-59912, and 61-59914 as an ejection energy supplying means and eject liquid droplets by bubbles formed in the ink by thermal energy. In such an ink-jet recording system, the recording head orifice can readily be multiplied in a high density to obtain images with high resolution and high quality at a high speed.

In conventional ink-jet recording systems, the ink is mainly composed of water and contains a water-soluble high-boiling solvent such as glycol to prevent drying of ink in the nozzle and clogging of the nozzle, and for other purposes. Such an ink may cause problems of incomplete fixation of the ink, or nonuniformity of the formed image presumably caused by nonuniform distribution of a filler or a sizing agent on the face of a recording medium paper sheet. On the other hand, in recent years, the ink-jet record is required to have a high image quality comparable to that of a silver salt photograph, and to give a higher image density and a broader color reproduction range of the ink-jet recorded image, and higher uniformity of the color of the record.

In such circumstances, many methods are disclosed for stabilization of the ink-jet recording process and improvement of quality of ink-jet recorded images. One disclosed method is coating of the surface of the base paper sheet or a recording medium with a filler or a sizing agent. For example, porous fine particles capable of adsorbing a coloring material are applied as a filler on a base paper sheet to form an ink-receiving layer. Coat paper sheets for ink-jet recording are commercially produced by employing such techniques.

In such circumstances, may methods are disclosed for stabilization of the ink-jet recording and improvement of quality of ink-jet recorded matters. Other typical methods are summarized below.

(1) Incorporation of a Volatile Solvent, or a Penetrative Solvent into an Ink:

Japanese Patent Application Laid-Open No. 55-65269 discloses addition of a compound which promotes penetration of a surfactant or the like into the ink for accelerating fixation of the ink on the recording medium. Japanese Patent Application Laid-Open No. 55-66976 discloses an ink mainly composed of a volatile solvent.

(2) Mixing of an Ink with a Liquid Composition Reactive to the Ink on a Recording Medium:

An image-improving liquid composition is applied on a recording medium, before or after application of a recording ink, to improve image density and water resistance and to prevent bleeding.

Japanese Patent Application Laid-Open No. 63-60783 discloses preliminary application of a basic polymer-containing liquid composition and subsequent recording with an anionic dye-containing ink. Japanese Patent Application Laid-Open No. 63-22681 discloses a recording method in which a first liquid composition containing a reactive chemical species and a second liquid composition containing a compound capable of reacting with the reactive chemical species are mixed on a recording medium. Japanese Patent Application Laid-Open No. 63-299971 discloses preliminary application of a liquid composition containing an organic compound having two or more cationic groups in the molecule onto a recording medium and subsequent recording with an ink containing an anionic dye. Japanese Patent Application Laid-Open No. 64-9279 discloses a recording method in which an acidic composition containing succinic acid or the like is applied onto a recording medium and subsequently recording is conducted with an ink containing an anionic dye.

Japanese Patent Application Laid-Open No. 64-63185 discloses application of a liquid composition capable of insolubilizing an ink dye before recording with an ink. Japanese Patent Application Laid-Open No. 8-224955 discloses use of a liquid composition containing cationic substances of different molecular distribution ranges in combination with an ink. Japanese Patent Application Laid-Open No. 8-72393 discloses use of a liquid composition containing a cationic substance and finely pulverized cellulose in combination with an ink. These methods gives excellent image with high image density, high print quality, high water resistance, high color reproducibility, and less bleeding. Japanese Patent Application Laid-Open No. 55-150396 discloses application of a water resistance-imparting agent which forms a lake by reaction with the dye after recording with a dye ink to improve water resistance of a recorded image.

(3) Mixing of an Ink with a Fine Particle-containing Liquid Composition on a Recording Medium:

Japanese Patent Application Laid-Open No. 4-259590 discloses application of colorless liquid containing colorless inorganic fine particles on a recording medium and subsequent application of nonaqueous recording liquid thereto. Japanese Patent Application Laid-Open No. 6-92010 discloses a method in which a solution containing fine particles or a solution containing fine particles and a binder polymer is applied first and subsequently an ink containing a pigment, a water-soluble resin, a water-soluble solvent, and water is applied. These methods are said to give images with high print quality and high coloring property.

(Background Technique)

The inventors of the present invention, after comprehensive investigation on various ink-jet recording techniques as mentioned above, found that the above described methods achieve remarkable effects in solving the respective technical problems, but other ink-jet recording properties may be impaired instead. For example, the aforementioned recording medium having a surface of a base paper sheet coated with a filler or a sizing agent (hereinafter referred to as "a coat paper sheet") is recognized to be capable of forming a high-quality image.

Generally, for obtaining an image of high chroma, it is known that the coloring material should be retained on the surface of a recording medium in a monomolecular state without aggregation. The fine porous particles on the coat paper sheet serve surely to retain the coloring material.

However, for achieving a high image density and high image chroma, a larger amount of the porous fine particles is required to form a thick ink-receiving layer to cover the base paper sheet, which impairs the feel of the base paper sheet. The inventors of the present invention presumed that such a thick ink-receiving layer is required because the coloring material is not effectively adsorbed by the porous fine particles.

For the explanation below, a coat paper sheet is taken which has one ink-receiving layer. FIG. 9 shows schematically a cross section of a surface and its vicinity of the coat paper sheet. In FIG. 9, the numeral 901 denotes a base paper sheet, the numeral 903 denotes an ink-receiving layer, and the numeral 909 denotes a coloring material. The ink receiving layer 903 contains porous fine particles 905 and an adhesive 907 for fixing the porous fine particles. The ink applied on the paper sheet penetrates into interstices between the porous fine particles by capillarity to form ink penetration regions. Since the porous fine particles distribute not completely uniformly as shown in FIG. 9, the penetration is not uniform locally, and the penetration of the ink by capillarity is also not uniform locally. Therefore, in the process of penetration of the ink, the coloring material 909 is not brought into uniform contact with the surface of the porous fine particles, resulting in ineffective adsorption of the coloring material by the porous fine particles.

Moreover, the adhesive 907 may hinder the penetration of the ink in some portions to leave non-penetrated regions which do not contribute the coloring property. From the above reasons, in a conventional coat paper sheet, the porous fine particles cannot effectively adsorb the coloring material in a monomolecular state for the amount of the particles. Therefore, a larger amount of the porous fine particles should be used for obtaining a high-quality image, which impairs the feel of the base paper sheet.

By employing the above technique (1), fixation of an ink on a recording medium is improved, but the image density and the color reproduction range, which is important in recording on plain paper or in color image recording, may become insufficient. Further, according to the above technique (2), high image density owing to retention of coloring material in the ink on the surface of a recording medium is achieved, but the color reproduction range or chroma may be lowered, probably owing to agglomeration of the coloring material on the surface of the recording medium. Thus, since the conventional methods have problems, in order to obtain a higher quality ink-jet recording image that has been sought recently, the inventors have recognized the need for the development of novel ink-jet recording techniques. The present invention is based on such new recognitions.

SUMMARY OF THE INVENTION

Accordingly, an object of the present invention is to provide a liquid composition to be used for obtaining ink-jet recording images having higher quality.

An object of the present invention is also to provide a method for forming colored area onto a recording medium in which superior ink-jet recording matter having broad color reproduction area, superior color uniformity, less stripy unevenness at solid parts and good rub-off resistance can be formed on a plain paper.

Another object of the present invention is to provide a liquid composition which can form an ink-jet recording image having a broad color reproduction area, superior color uniformity, less stripy unevenness at solid parts and good rub-off resistance, an ink set in a combination with the liquid composition and an ink-jet recording apparatus.

In an embodiment of the present invention, the present invention is to provide an aqueous liquid composition for forming a colored area of an image on a recording medium by application with an anionic or cationic aqueous ink containing a coloring material, the aqueous liquid composition containing fine particles dispersed therein and the fine particles being charged at a surface in a polarity opposite to the ink.

In another embodiment of the present invention, the present invention is to provide an ink set comprising an aqueous anionic or cationic ink containing a coloring material and an aqueous liquid composition containing fine particles dispersed therein and being charged at a surface in a polarity opposite to the ink in a combination.

In still another embodiment of the present invention, the present invention is to provide a method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state.

In still another embodiment of the present invention, the present invention is to provide an ink-jet recording apparatus comprising a first recording unit having an ink container for holding an aqueous anionic or cationic ink containing a coloring material, and a first ink-jet head for ejecting the ink; and a second recording unit having a liquid composition container for holding a liquid composition containing fine particles dispersed therein and electrically charged at the surface in a polarity opposite to the aqueous ink, and a second ink-jet head for ejecting the liquid composition.

In still another embodiment of the present invention, the present invention is to provide a liquid composition for forming a colored area of an image on a recording medium with a cationic or anionic ink containing a coloring material, the coloring material being in a molecular state in the ink, the liquid composition comprising a fine particle, wherein the particle adsorbs or binds the coloring material on the surface thereof with substantially maintaining the molecular state to form the colored area when the ink and the liquid composition are brought into contact with each other in a liquid-liquid state.

BRIEF DESCRIPTION OF THE DRAWINGS

FIGS. 14A, 14B, 14C, 14C-2 and 14D show schematically a process for formation of a colored portion of an ink-jet recorded image according to the present invention.

FIG. 16A shows lifting of an ink blade; FIG. 16B shows wiping of a print head; FIG. 16C shows lowering of an ink blade; FIG. 16D shows lifting of both blades after a liquid composition is set at a prescribed position; FIG. 16E shows wiping of the head for the liquid composition and of the head for a second black ink head; and FIG. 16F shows lowering of both blades.

DETAILED DESCRIPTION OF THE PREFERRED EMBODIMENTS

The present invention is described below in more detail by reference to preferred embodiments.

Preferred embodiment of forming a colored area onto a recording medium is a method comprising a first step (i) of applying an aqueous anionic or cationic ink onto a recording medium, and a second step (ii) of applying onto a recording medium a liquid composition containing fine particles dispersed therein and electrically charged at a surface in a polarity opposite to the ink, and in the surface of the recording medium the aqueous ink and the liquid composition are brought into contact in a liquid-liquid state. According to the above constitution of the present invention, an ink-jet recorded image can be formed with a broad color reproduction range, uniformity of the colors, effective prevention of stripy unevenness at a solid portion and high rub-off resistance of the record.

As an embodiment of the ink set of the present invention to achieve the above object, an ink set is provided comprising an aqueous anionic or cationic ink containing a coloring material and an aqueous liquid composition containing fine particles dispersed therein and being charged at a surface in a polarity opposite to the ink in a combination. By employing such an ink set, an ink-jet recorded image can be obtained with a broad color reproduction range, uniformity of the colors, less stripy unevenness of a solid portion and high rub-off resistance of the record. Further, the aqueous ink and the liquid composition have respectively simple constitution in itself, and therefore the aqueous ink and the liquid composition have high storability to enable stable formation of an ink-jet recorded image with high image quality.

The reasons for obtaining the above effects are not clarified, but the above effects are presumably achieved by the reasons below.

Figure 13:
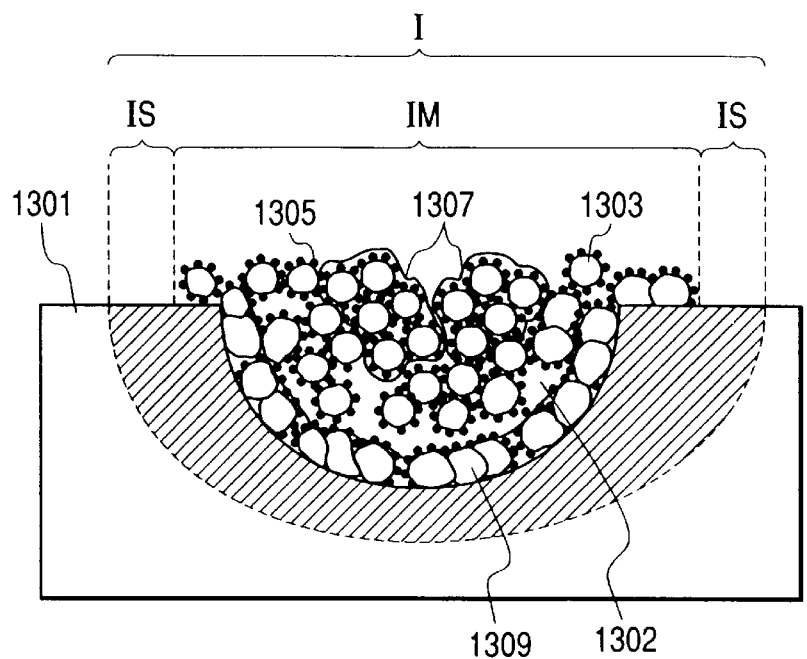
FIG. 13 is a schematic sectional view for explaining the state of a colored portion of an ink-jet image of the present invention.

Firstly, a mechanism of recording according to the present invention is explained in accordance with FIG. 13 and FIG. 14. In the following explanation, an aqueous ink containing an aqueous dye having anionic group (anionic dye) is used as an ink, and as a liquid composition an aqueous liquid composition containing fine particles of which the surface is cationically charged in a dispersion state is used simultaneously.

The image formation according to the present invention is explained below by reference to FIG. 13.

For the explanation, the terms are defined. In the present invention, "a monomolecular state" means a state of the coloring material, a dye or a pigment, almost dissolved or dispersed in the ink. The state containing a slight aggregation of the coloring material is included in the "monomolecular state" in the present invention. Since the dye is preferably in a monomolecular state, the dissolved or dispersed state of the coloring materials other than the dye is called "a monomolecular state".

FIG. 13 shows schematically a state of the colored area I of a recorded image of the present invention constituted of a main image portion IM and a surrounding portion IS. In FIG. 13, the numeral 1301 denotes a recording medium; 1302, an interstice between fibers of the recording medium; 1303, a fine particle adsorbing or binding chemically or physically a coloring material 1305.

As shown in FIG. 13, in ink-jet recorded image in the present invention, the main image portion IM is constituted of fine particles 1303 having a coloring material 1305 adsorbed uniformly in a monomolecular or nearly monomolecular state (hereinafter simply referred to "a monomolecular state") on the surface thereof and aggregate 1307 of the fine particles having the coloring material adsorbed in a monomolecular state. The numeral 1309 denotes an aggregate of the fine particles near the recording medium fiber in the main image portion IM. The main image portion IM is formed through physical or chemical adsorption of fine particles 1303 by the recording medium fibers, and adsorption of the coloring material 1305 by the fine particles 1303 in a liquid-liquid state. Therefore, the developability of the coloring material itself is impaired little, and even on a recording medium like a plain paper sheet which is readily permeable to the ink, an image can be formed with a high density and a chroma of the recorded image and with a color reproduction range comparable to that of coat paper.

On the other hand, the portion of the coloring material 1305 not adsorbed by the surface of the fine particles 1303 and remaining in the ink will penetrate in a lateral direction as well as in a depth direction in the recording medium 1301, thereby forming fine bleeding of the ink in the surrounding portion IS. The coloring material remaining on the face of the recording medium 1301 and the fine bleeding of the ink in the surrounding portion will decrease white haze and color irregularity to improve color uniformity even in the image area like a shadow portion or a solid print portion where a large amount of ink is applied.

FIGS. 14A to 14D show schematically rough sectional views of a colored portion 1400 and a process for formation thereof in an embodiment of image formation of the colored area onto the recording medium of the present invention. In FIGS. 14A to 14D, the numeral 1401 denotes the region containing the main portion of the reaction product of the ink and the liquid composition, e.g., a product of the reaction of the coloring material and the fine particles (hereinafter referred to as "a reaction region"). This region corresponds to the main image part IM in FIG. 13. The numeral 1402 denotes the part formed by flow-out of the ink not having reacted with the liquid composition in the periphery of the reaction region 1401 (hereinafter referred to as "ink flow-out region"), corresponding to the surrounding part IS in FIG.

13. The colored area 1400 is formed, for example, as below. The numeral 1405 denotes interstices between fibers of the recording medium illustrated schematically.

Firstly, a liquid composition 1406 reactive to a coloring material 1404 is applied in a form of a liquid drop to a recording medium 1403 (FIG. 14A). Thereby, a liquid pool 1407 of the liquid composition is formed (FIG. 14B). Fine particles 1409 near the surface of the fiber of the recording medium are adsorbed physically or chemically by the surface of the fiber of the recording medium. In this step, some of the particles become instable in dispersion to form aggregates 1411. On the other hand, the fine particles 1409 far from the fiber in the liquid pool 1407 keep dispersion state.

Then, an ink 1413 is applied in a form of a liquid drop onto the recording medium 1403 (FIG. 14B). Thereby, the coloring material 1404 is adsorbed chemically to the fine particles 1409 at the interface between the ink 1413 and the liquid pool 1407. Since the chemical adsorption reaction proceeds between the liquids (by liquid-liquid reaction), the coloring material 1404 is adsorbed uniformly in a monomolecular state by the surface of the fine particles 1409 (FIG. 14C-2), and does not aggregate or aggregates little on the surface of the fine particles. Consequently, many particles are formed which have coloring material 1404 adsorbed thereon in a monomolecular state, in the surface layer portion of the reaction region 1401 to keep the coloring material in a monomolecular state on the surface layer affecting greatly the coloring property (or color development), giving a recorded image a high image density with a high chroma. The "liquid-liquid reaction" includes a reaction reacted in a solution or a dispersion containing reactive materials in addition to a liquid of reactive materials.

Figure 2:
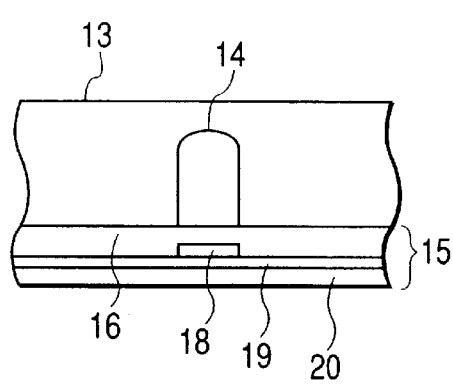
FIG. 2 is the lateral sectional view of a head of the ink-jet recording apparatus.

The fine particles having the coloring material 1404 adsorbed become unstable to cause aggregation between the fine particles (FIG. 14C-2). The formed aggregate 1415 retains also the coloring material in a monomolecular state in the interior thereof. This aggregate 1415 forms a recorded image at a high image density with high chroma.

Another part of the unreacted coloring material 1404 diffuses in the liquid pool 1407 to be adsorbed by an unreacted surface of the fine particle 1409. The further progress of the reaction in the liquid pool 1407 enables image formation at a higher density with high chroma. The aforementioned aggregates 1411 of the fine particles formed on the surface of the fiber of the recording medium would serve to impede penetration of the liquid phase into the recording medium. Therefore, in the liquid pool 1407, more fine particles 1409 and more coloring material 1404 can exist in the liquid composition made less penetrative, whereby the contact of the coloring 1404 with the fine particles 1409 is promoted, allowing more uniform and sufficient reaction to give a uniform image at a high image density with high chroma.

When the liquid composition 1406 is applied to the recording medium 1403 (FIG. 14A), or when the ink 1413 is applied to the liquid pool 1407 (FIG. 14B), the dispersion medium containing the dispersed fine particles 1409 can become changed in properties to instabilize the dispersion of the fine particles 1409, causing aggregation of some of the fine particles 1409 before adsorption of the coloring material 1404. Here the change of the dispersion medium signifies a change of properties caused by mixing of two or more different kinds of liquids: the properties such as pH, a solid content, a solvent composition, and a dissolved ion concentration. Upon contact of the liquid composition with the recording medium or the ink, the changes can arise quickly and concurrently to destroy the dispersion stability of the fine particles to cause aggregation of the particles.

The aggregate is estimated to serve to fill the interstices, or to keep the fine particles with the adsorbed coloring material near the surface of the recording medium. Some of the aggregates formed in the liquid pool 1407 are adsorbed by the recording medium, whereas some of them are mobile (flowable) in the liquid phase. The flowable aggregates, similarly as in the reaction process of the coloring material with the fine particles, adsorb the coloring material in a monomolecular state on the surface of the fine particle aggregate to form a larger aggregate, which contributes to improvement of the color developability. This larger aggregate may move with the liquid phase penetrating along the fiber to fill the interstice to smoothen the surface of the recording medium, which contributes to uniformize and densify the image.

High-color images can be formed according to the invention as described later. This may be caused by adsorption of the coloring material in a monomolecular state on the fine particles or their aggregates remaining on or near the surface of the recording medium. The fine particles having adsorbed the coloring material remain on the surface of the recording medium and are fixed thereto, and improve the fastness of the image.

The above description is explained in the case when the liquid composition and the ink are applied to the recording medium in this order. However, so long as liquid-liquid mixture of the ink and the liquid composition is achieved, the applied order of the liquid composition and the ink onto the recording medium is not limited, and the ink may be applied before the liquid composition.

As shown in FIG. 14B, at least one part of fine particles in the liquid composition applied to the recording medium may penetrate into the interior of the recording medium accompanying the penetration of the liquid medium into the interior of the recording medium. On the other hand, as shown in FIG. 14D, all coloring material in the ink is not adsorbed or bound to fine particles on the recording medium, some of the coloring material is penetrated into the interior of the recording medium accompanying the penetration of the ink into the liquid medium. Through this process, as shown in FIG. 14D, the coloring materials may be adsorbed or bound to fine particles previously penetrated in a monomolecular state. Thus, in the interior of the recording medium, the fine particles to which the coloring materials are adsorbed or bound in a monomolecular state may contribute to improving the coloring property. Further, such penetration of the liquid medium may contribute to improving the fixing performance.

On or near the surface of the recording medium, the fine particles and the coloring material are reacted in a liquid phase to adsorb the coloring material onto the surface of cationic fine particles with remarkably good efficiency. In an ink-jet recording coat paper sheet, a larger amount of cationic porous fine particles are necessary for achieving the coloring material adsorption to the same extent as in the present invention to form a thick ink-receiving layer to cover completely the base paper sheet. This impairs the feel of the base paper. In the present invention, since the amount of the fine particles used in the liquid composition is smaller, the image can be formed without impairing the feel of the recording medium and without incongruity between printed and unprinted areas.

The present invention relates to formation of an image by applying a liquid composition containing fine particles and an ink onto a recording medium surface, and therefore it appears that in the present invention, similar to the prior method (3) mentioned above, the liquid composition containing fine particles is externally added to the ink. However, in the present invention, the fine particles in the liquid composition are used as means for inhibiting aggregation (laking) of a coloring material by actively reacting the liquid composition and the coloring material. On the other hand, in the part art (3), the object of applying the solution containing fine particles is to modify the surface condition of the recording medium. Therefore, the prior art (3) does not disclose any technical idea that chemical reaction is produced between fine particles having different polarity and the coloring material in the ink. Further, it was clarified that differences between the recorded matter of the prior art recording technique and the recorded image obtained by the present invention was clarified in quality, which was surmised to be caused by differences of the mechanism.

The method for forming a colored area onto a recording medium of an embodiment of the present invention comprising a first step (i) of applying an aqueous anionic or cationic ink containing a coloring material onto a recording medium, and a second step (ii) of applying onto a recording medium a liquid composition containing fine particles dispersed therein and electrically charged at a surface in a polarity opposite to the ink, wherein the aqueous ink and the liquid composition are brought into contact in a liquid-liquid state.

The aqueous ink and the liquid composition of the present invention are described below in detail. Firstly, the cationic ink or the anionic ink is defined below. In referring to the ionic property, the ink itself is not charged and is neutral. The cationic ink or the anionic ink herein means an ink in which the component in the ink, for example a coloring material, has an anionic group or a cationic group, and the ink is adjusted so that the group may behave as the anionic group or the cationic group in the ink. Further, with regard to anionic or cationic liquid composition, such meaning is the same as mentioned above.

LIQUID COMPOSITION

The liquid composition in the present invention is characterized by its charge polarity opposite to that of the ink used in combination. Therefore, a cationic liquid composition or an anionic liquid composition is used depending on the charge polarity of the ink.

[Cationic Liquid Composition]

A cationic liquid composition contains, for example, fine particles having a cationic group on the surface and an acid, the fine particles being dispersed stably therein. The cationic liquid composition in the present invention, for example, contains an acid and the pH is adjusted in the range of 2 to 7, or has a zeta potential in the range from +5 to +90 mV.

(pH and Zeta Potential)

The zeta potential of the liquid composition is explained below. Generally, in a liquid dispersion of a solid which has a free charge on the surface, a charged layer of an opposite polarity is formed in proximity to the interface of the solid in the liquid to keep the system electrically neutral. The pair of the layers is called electrical double layers, and the potential difference between the electrical double layers is called a zeta potential. When the zeta potential is positive, the surface of the fine particles is cationic, whereas when it is negative, the surface is anionic. Generally, at a higher absolute value of the zeta potential, the electrostatic repulsion force is stronger between the fine particles, giving higher dispersibility, and stronger ionic properties on the fine particle surface. That is, the higher the zeta potential of cationic fine particles, the stronger is the cationic properties to attract an anionic compound in the ink.

After comprehensive investigation, the inventors of the present invention found that use of the liquid composition having a zeta potential ranging from +5 to +90 mV enables formation of a colored area with excellent coloring property on a recording medium. This is probably due to a suitable cationic property of the fine particles which retards quick aggregation of the anionic compound to allow thin and uniform adsorption, retarding formation of large lake particles, and thereby giving a favorable state of inherent color developability of the coloring material. In the cationic liquid composition employed in the present invention, presumably the fine particles become unstable in dispersion by keeping a weakly cationic property to facilitate adsorption of the fine particles onto the surface of an anionic cellulose fibers or the like in the recording medium while agglomerating, and to remain on or near the surface of the recording medium.

Consequently, according to the present invention, the effects below are obtained. An image can be obtained with excellent coloring properties and with less white haze and color uniformity in print areas such as a shadow portion or a solid print portion where a larger amount of ink is applied. The anionic compound is adsorbed efficiently by the fine particles to develop a color in comparison with coat paper. Therefore, the amount of the cationic fine particles can be decreased, so that recording can be conducted, particularly when recording is carried out on plain paper, without impairing the feel of the paper and with high rub-off resistance. The zeta potential of the liquid composition is preferably in the range from +10 to +85 mV. In this range, the border between dots is not noticeable in a solid print, and an excellent image can be formed without stripy unevenness in head-scanning. In the range from +15 to +65 mV, an excellent color image can be formed regardless of the kind of paper.

The pH of the cationic liquid composition used in the present invention ranges preferably from 2 to 7 at about 25° C. in view of the storage stability thereof and adsorption of the anionic compound. Within this pH range, the stability of the anionic compound is not significantly lowered by mixing with the anionic ink, not causing strong aggregation of the anionic compound, and preventing effectively drop of chroma of the recorded image or dulling of the image. Further in the above-mentioned pH range, the cationic fine particles can be dispersed well, and the stability in storage and in ejection through a recording head of the liquid composition are maintained satisfactorily. The anionic substance is adsorbed sufficiently on mixing with an ink to prevent excessive penetration of the coloring material into the recording medium, producing an ink-jet record with excellent coloring property. The pH is more preferably in the range from 3 to 6. Within this range, corrosion of the recording head is effectively prevented, and the rub-off resistance of the print is improved further.

(Cationic Fine Particles)

Next, components constituting the cationic liquid composition of the present invention is explained. The cationic fine particles employed as the first component in the present invention is cationic on the surface of the particles in a state of dispersion in the liquid composition for achieving the aforementioned effects. The cationic surface quickly adsorbs the anionic coloring material on mixing with the anionic ink and retards excessive penetration of the coloring material into the recording medium to produce an ink-jet recorded image with sufficient image density. In contrast, when the surface of the fine particles is not cationic and the fine particles are separate from a water-soluble cationic compound in the liquid composition, the cationic compound causes the aggregation of the coloring material, impairing the coloring property of the coloring material. As such, the coloring property is not comparable with the image formed on an ink-jet recording coat paper sheet. Therefore, the fine particle material in the liquid composition used in the present invention, which should have a cationic surface, includes inherently cationic fine particles, as well as inherently anionic or neutral fine particles cationized by surface treatment.

The material of the cationic fine particles suitable for use in the present invention is not specially limited, and includes inorganic fine particulates, organic fine particulates, and inorganic-organic fine particulate composites. Specifically, the inorganic particulates include cationized particulates of silica, alumina, alumina hydrate, titania, zirconia, boria, silica-boria, ceria, magnesia, silica-magnesia, calcium carbonate, magnesium carbonate, zinc oxide, and hydrotalsite. The organic particulates include cationic emulsions or latexes of diene copolymers and vinyl copolymers such as styrene-acrylic copolymers, acrylate ester copolymers, methacrylate ester copolymers, SBR latexes, and ethylene-vinyl acetate copolymers; cation-modified melamine beads, and cation-modified plastic pigments. The inorganic-organic fine particulate composites include fine particulates of inorganic particles having primary, secondary, or tertiary amine salt type functional groups on the surface. In the liquid composition of the present invention, these cationic fine particles may be used alone or in combination of two or more kinds.

The above cationic fine particles used in the present invention have an average particle diameter ranging from 0.005 to 1 $\mu$m as measured by dynamic light scattering system in view of coloring property, and color uniformity after printing, and storage stability. In this range, the excessive penetration of the coloring material into the recording medium can be effectively prevented without drop of the color developability and of color uniformity. Further, sedimentation of the cationic fine particles in the liquid composition is also prevented to maintain effectively the storage stability of the liquid composition. More preferably the average particle diameter is in the range from 0.01 to 0.8 $\mu$m. By use of such fine particles, the image printed on a recording medium is excellent especially in rub-off resistance and feel of the record.

The content of the aforementioned cationic fine particles in the liquid composition in the present invention is decided in a suitable range depending on the kind of the material to be used. The range is preferably from 0.1% to 40% by weight, more preferably from 1% to 30% by weight, still more preferably from 3% to 15% by weight. Within this range, images can be formed steadily with excellent coloring property independently of the kind of paper, and the storage stability and the ejection stability of the liquid composition are excellent.

(Acid)

The liquid composition used in the present invention contains an acid, and has a pH adjusted in the range preferably from 2 to 7, as described above. The acid as a second component ionizes the surface of the cationic fine particle and raises the surface potential, serving to improve the dispersion stability of the fine particles in the liquid and the ability for adsorbing the anionic compound in the ink, and to adjust the viscosity of the liquid composition. The acid suitable in the present invention is not specially limited, provided that the acid in combination with the cationic fine particles gives prescribed properties such as the pH, the zeta potential, and the fine particle dispersibility.

The acid includes specifically inorganic acids such as hydrochloric acid, sulfuric acid, sulfurous acid, nitric acid, nitrous acid, phosphoric acid, boric acid, and carbonic acid; organic acids such as carboxylic acids, sulfonic acids, and amino acids mentioned below. The carboxylic acids includes formic acid, acetic acid, chloroacetic acid, dichloroacetic acid, trichloracetic acid, fluoroacetic acid, trimethylacetic acid, methoxyacetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexane-carboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid, p-aminobenzoic acid, o-methoxybenzoic acid, m-methoxybenzoic acid, and p-methoxybenzoic acid. The sulfonic acid includes benzenesulfonic acid, methylbenzenesulfonic acid, ethylbenzenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid, and dodecanesulfonic acid. The amino acid includes glycine, alanine, valine, $\alpha$-aminobutyric acid, $\gamma$-aminobutyric acid, $\beta$-alanine, taurine, serine, $\epsilon$-amino-n-caproic acid, leucine, norleucine, and phenylalanine.

One or more acids may be used combinedly in the liquid composition in the present invention. Of the acids, the one which has a primary dissociation constant pKa of not higher than 5 in water is suitable because of its excellent ability of stabilization of cationic fine particle dispersion and excellent adsorption ability of adsorbing the cationic fine particles. Specifically the suitable acid includes hydrochloric acid, nitric acid, sulfuric acid, phosphoric acid, acetic acid, formic acid, oxalic acid, lactic acid, citric acid, maleic acid, and malonic acid.

In the liquid composition in the present invention, the mixing ratio of the cationic fine particles to the acid ranges preferably from 200:1 to 5:1, more preferably from 150:1 to 8:1 by weight for improvement of the dispersion stability of the cationic fine particles and improvement of adsorption ability of the anionic compound to the fine particle surface.

(Other Constituents)

The other constituents of the cationic liquid composition are specifically explained below. The cationic liquid composition used in the present invention contains the aforementioned cationic fine particles as the essential component, and preferably the above mentioned acid, and usually water as the liquid medium. The liquid composition may further contain a water-soluble organic solvent and an additive. The water-soluble organic solvent includes amides such as dimethylformamide, and dimethylacetamide; ketones such as acetone; ethers such as tetrahydrofuran, and dioxane; polyalkylene glycols such as polyethylene glycol, and polypropylene glycol; alkylene glycols such as ethylene glycol, propylene glycol, butylene glycol, triethylene glycol, 1,2,6-hexanetriol, thiodiglycol, hexylene glycol, and diethylene glycol; lower alkyl ethers of polyhydric alcohols such as ethylene glycol methyl ether, diethylene glycol monomethyl ether, and triethylene glycol monomethyl ether; primary alcohols such as ethanol, isopropyl alcohol, n-butyl alcohol, and isobutyl alcohol; glycerin; N-methyl-2-pyrrolidone; 1,3-dimethyl-imidazolidinone: triethanolamine; sulfolane; and dimethylsulfoxide. The content of the above water-soluble solvent is, for example, in the range from 5% to 60% by weight, preferably from 5% to 40% by weight based on the total weight of the liquid composition, but is not limited thereto.

The liquid composition used in the present invention may further contain an additive such as a viscosity controller, a pH controller, an antiseptic, a surfactant, an antioxidant, an evaporation promoter, a water-soluble cationic compound, and a binder resin, if necessary. The selection of the surfactant is particularly important in controlling the penetrability of the liquid composition into the recording medium. The water-soluble cationic compound may be added arbitrarily for the purpose of imparting further the cationic property to the liquid composition in a suitable amount provided that the addition does not reduce the effects of the present invention.

The binder resin may be used additionally for the purpose of further improvement of rub-off resistance of the cationic fine particles in such an amount that the feel of the recording medium, the storage stability, and ejection stability are not impaired. The binder resin may be selected and used from water-soluble polymers, emulsions, and latexes, or the like.

(Surface Tension of Liquid Composition)

The liquid composition used in the present invention is preferably colorless or white. However, the composition may be colored corresponding to the color of the recording medium. The liquid composition has a surface tension ranging preferably from 10 to 60 mN/m (dyn/cm), more preferably from 10 to 40 mN/m (dyn/cm), and a viscosity ranging from 1 to 30 mpa·s (cP).

[Anionic Liquid Composition]

The anionic liquid composition used in the present invention is characterized in that it contains fine particles having an anionic group on the surface as the essential component, and the fine particles are dispersed stably therein. The anionic composition preferably contains a base, having a pH in the range of 7 to 12, having a zeta potential in the range from −5 to −90 mV.

(pH and Zeta Potential)

After comprehensive investigation, the inventors of the present invention found that the liquid composition having a zeta potential ranging from −5 to −90 mV allows effective adsorption of the cationic compound in the ink by the surface of the anionic fine particles to give excellent coloring property on a recording medium. This is probably due to a suitable anionic property of the fine particles which retards quick aggregation of the cationic compound in the ink to allow thin and uniform adsorption, retarding formation of large lake particles, and thereby giving a favorable state of inherent color developability of the coloring material, similarly as in the case of the aforementioned cationic liquid composition. In the anionic composition employed in the present invention, presumably the fine particles become unstable after adsorption of the cationic compound on the surface, tending to aggregate together by concentration change by penetration of the solvent component into the recording medium and to remain on or near the surface of the recording medium.

Consequently, according to the present invention, the effects below are obtained. An image can be obtained on plain paper with excellent coloring property comparable to that on ink-jet recording coat paper with less white haze with color uniformity in the print area like a shadow portion or a solid print portion where a larger amount of ink is applied. The anionic compound is adsorbed efficiently by the fine particles to develop a color in comparison with coat paper. Therefore, the amount of the anionic fine particles can be decreased, so that printing can be conducted without impairing the feel of the paper and with high rub-off resistance. The zeta potential of the liquid composition is preferably in the range from −10 to −85 mV. In the liquid composition in this range, the anionic fine particles having the cationic compound adsorbed on the surface will spread properly on the recording medium, making less noticeable the border between dots in a solid print, and an excellent image can be formed without stripy unevenness in head-scanning. In the range from −15 to −65 mV, excellent color images can be formed regardless of the kind of paper.

The pH of the anionic liquid composition used in the present invention ranges preferably from 7 to 12 at about 25° C. in view of the storage stability thereof and adsorption of the cationic compound. Within this pH range, the stability of the cationic compound is not significantly lowered by mixing with the cationic ink, not causing firm aggregation of the anionic compound, and preventing effectively drop of chroma of the recorded image or dulling of the image. Further in the above-mentioned pH range, the cationic fine particles can be dispersed well, and the stability in storage and in ejection through a recording head of the liquid composition are maintained satisfactorily. The cationic substance is adsorbed sufficiently by the anionic fine particle surface on mixing with an ink to prevent excessive penetration of the coloring material into the recording medium, producing an ink-jet record with excellent coloring property. The pH is more preferably in the range from 8 to 11. Within this range, corrosion of the recording head is effectively prevented, and the rub-off resistance of the print is improved more.

(Anionic Fine Particles)

Next, the component constituting the anionic liquid composition of the present invention is explained. The anionic fine particles employed as the first component in the present invention is anionic on the surface of the particles in a state of dispersion in the liquid composition for achieving the aforementioned effects. The anionic surface quickly adsorbs the cationic coloring material on mixing with the cationic ink and retards excessive penetration of the cationic coloring material into the recording medium to produce an ink-jet recorded matter with sufficient image density. In contrast, when the surface of the fine particles is not anionic and the fine particles are separate from a water-soluble anionic compound in the liquid composition, the anionic compound causes the aggregation of the coloring material to impair the coloring property of the coloring material and the coloring property cannot be comparable with the image formed on an ink-jet recording coat paper sheet. The fine particle material in the liquid composition used in the present invention, which should have an anionic surface, includes inherently cationic fine particles, as well as inherently anionic or neutral fine particles cationized by surface treatment.

The material of the anionic fine particles suitable for use in the present invention is not specially limited, and includes inorganic fine particulates, organic fine particulates, and inorganic-organic fine particulate composites. Specifically, the inorganic particulates include anionized particulates of silica, titania, zirconia, boria, silica-boria, ceria, magnesia, silica-magnesia, calcium carbonate, magnesium carbonate, and zinc oxide. The organic particulates include anionic emulsions or latexes of diene copolymers and vinyl copolymers such as styrene-acrylic copolymers, acrylate ester copolymers, methacrylate ester copolymers, SBR latexes, and ethylene-vinyl acetate copolymers; anion-modified melamine beads, and anion-modified plastic pigments. The inorganic-organic fine particulate composites include fine particulates of inorganic particles having in the surface a functional group which becomes anionic in water. In the liquid composition of the present invention, these components are used alone or in combination of two or more kinds.

The above anionic fine particles used in the present invention have an average particle diameter ranging from 0.005 to 1 $\mu$m as measured by dynamic light scattering system in view of coloring property and color uniformity after printing, and storage stability, similarly as in the case of the aforementioned cationic fine particles. More preferably the average particle diameter is in the range from 0.01 to 0.8 $\mu$m. By use of such fine particles, the image printed on a recording medium is excellent especially in rub-off resistance and feel of the record.

The content of the aforementioned anionic fine particles in the liquid composition mentioned above is decided in a suitable range depending on the kind of the material to be used. The range is preferably from 0.1% to 40%, more preferably from 1% to 30%, still more preferably from 3% to 15% by weight. Within this range, images can be formed steadily with excellent coloring property independently of the kind of paper, and the storage stability and the ejection stability of the liquid composition are excellent.

(Base)

The liquid composition used in the present invention contains a base, and has a pH adjusted in the range preferably from 7 to 12, as described above. The base as a second component ionizes the surface of the anionic fine particle surface and raises the surface potential, serving to improve the dispersion stability of the fine particles in the liquid and the ability for adsorbing the cationic compound in the ink, and to adjust the viscosity of the liquid composition. The base suitable in the present invention is not specially limited, provided that the base in combination with the anionic fine particles gives prescribed properties such as the pH, the zeta potential, and the fine particle dispersibility.

The base includes specifically the inorganic and organic compounds below: sodium hydroxide, lithium hydroxide, sodium carbonate, ammonium carbonate, ammonia, sodium acetate, ammonium acetate, morpholine, monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine, triisopropanolamine, and the like alkanolamines. Of these, the bases having a primary dissociation constant pKb of not higher than 5 in water are preferred since it improves the dispersion stability and adsorption of the cationic compound by the anionic fine particles.

In the liquid composition in the present invention, the mixing ratio of the anionic fine particles to the base ranges preferably from 200:1 to 5:1, more preferably from 150:1 to 8:1 by weight for improvement of the dispersion stability of the anionic fine particles and improvement of adsorption ability of the anionic compound to the fine particle surface.

(Other Constituents)

The anionic liquid composition used in the present invention contains the aforementioned anionic fine particles as the essential component, preferably the above mentioned base, and usually water as the liquid medium. The liquid composition may further contain a water-soluble organic solvent, and an additive such as a viscosity controller, a pH controller, an antiseptic, a surfactant, an antioxidant, an evaporation promotor, a water-soluble cationic compound, and a binder resin, if necessary.

(Surface Tension of Liquid Composition)

The liquid composition used in the present invention is preferably colorless or white. However, the composition may be colored corresponding to the color of the recording medium. The liquid composition has a surface tension ranging preferably from 10 to 60 mN/m (dyn/cm), more preferably from 10 to 40 mN/m (dyn/cm), and a viscosity ranging from 1 to 30 mpa·s (cP).

AQUEOUS INK

[Anionic Ink]

The aqueous anionic ink is explained which constitutes an ink set in combination with a liquid composition. The ink set herein means a combination of the liquid composition of the present invention with at least one anionic ink containing an anionic substance. A combination of one or more inks without the liquid composition of the present invention is called "an ink sub-set". The anionic ink used in the present invention contains a water-soluble dye having an anionic group, or contains a pigment as a coloring material and an anionic compound. The above anionic ink may further contain water, a water-soluble organic solvent, and an additive such as a viscosity controller, a pH controller, an antiseptic, a surfactant, and an antioxidant, as necessary. The constituting components of the ink are explained below.

(Water-soluble Dye)

The water-soluble dye having an anionic group used in the present invention may be selected from water-soluble acid dyes, direct dyes, and reactive dyes listed in Color Index without limitation. Any dyes having an anionic group such as a sulfonic group, carboxylic group, or the like may be used even if it is not listed in Color Index. The water-soluble dye includes also those which have a pH-depending solubility.

(Pigment)

The aqueous ink of another type may contain a pigment and an anionic compound in place of the above-mentioned aqueous dye having an anionic group, and additionally water, and a water-soluble organic solvent, and an additive such as a viscosity controller, a pH controller, an antiseptic, a surfactant, and an antioxidant, as necessary. The anionic compound may be a dispersant for the pigment. In the case where the dispersant for the pigment is not anionic, an anionic compound may be added to the dispersant. Naturally, another anionic compound may be added to the anionic dispersant.

The pigment useful in the present invention is not limited specially. The suitable pigments are shown below.

The carbon black used for the black pigment ink includes those produced by a furnace process, or a channel process having preferably the properties: primary particle diameter of 15 to 40 m$\mu$, BET specific surface area of 50 to 300 m$^2$/g, DBP absorptivity of 40 to 150 mL/100 g, volatile matter content of 0.5 to 10%, and pH of 2 to 9. The commercial products having such properties include No.2300, No.900, MCF88, No.40, No.52, MA7, MA8, and No.2200B (produced by Mitsubishi Chemical Co.); RAVEN 1255 (Produced by Columbia Co.); REGAL 400R, REGAL 660R, and MOGUL L (produced by Cabot Co.); and Color Black FW-1, Color Black FW18, Color Black S170, Color Black S150, Printex 35, and Printex U (produced by Degussa Co.).

An experimental pigment prepared for use in the present invention is also useful.

The pigment for the yellow ink includes C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83.

The pigment for the magenta ink includes C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112, and C.I. Pigment Red 122.

The pigment for the cyan ink includes C.I. Pigment Blue 1, C.I. Pigment Blue 2, C.I. Pigment Blue 3, C.I. Pigment Blue 15.3, C.I. Pigment Blue 16, C.I. Pigment Blue 22, C.I. Vat Blue 4, and C.I. Vat Blue 6.

The coloring material of any of the colors may be an experimental product produced for use in the present invention.

(Pigment Dispersant)

The dispersant for the pigment of the ink of the present invention may be any water-soluble resin which has a function of dispersing stably the pigment in the presence of an anionic group in water or an aqueous medium. Its weight-average molecular weight is preferably in the range from 1,000 to 30,000, more preferably from 3,000 to 15,000. Specifically, the water-soluble resin includes block copolymers, graft copolymers, random copolymers, and salts thereof produced from two or more hydrophilic monomers and hydrophobic monomers: the hydrophobic monomers including styrene and its derivatives, vinylnaphthalene and its derivatives, and aliphatic alcohol esters of $\alpha,\beta$-ethylenic unsaturated carboxylic acid; and the hydrophilic monomers including acrylic acid and its derivatives, maleic acid and its derivatives, itaconic acid and its derivatives, and fumaric acid and its derivatives. These resins are alkali-soluble polymers soluble in an aqueous solution containing a base dissolved therein.

Further, the dispersant may be a homopolymer or its salt produced from a hydrophilic monomer. Also useful are water-soluble resins such as polyvinyl alcohol, carboxymethylcellulose, and naphthalenesulfonic acid-formaldehyde condensates. Of these resins, alkali-soluble type resins are advantageous because of lower viscosity of the liquid dispersion and ease of dispersion. The water-soluble resin is used in an amount ranging preferably from 0.1% to 5% by weight based on the total weight of the ink.

The pigment ink useful in the present invention is produced by dispersing or dissolving the aforementioned pigment and the water-soluble resin in an aqueous medium. The suitable aqueous medium for the pigment type ink useful in the present invention is a mixed solvent composed of water and a water-soluble organic solvent. The water is preferably ion-exchanged water (deionized water), not usual ion-containing water.

If the dispersant is not an anionic polymer, an anionic compound is preferably added further to the ink containing the aforementioned pigment. The anionic compound suitably used in the present invention includes the alkali-soluble resins explained above as the pigment dispersant as well as low-molecular anionic surfactants shown below.

The low-molecular anionic surfactant includes specifically disodium lauryl sulfosuccinate, disodium polyoxyethylenelauroylethanolamido-sulfosuccinate, sodium salt of carboxylated polyoxyethylene lauryl ether, sodium salt of carboxylated polyoxyethylene lauryl ether, sodium salt of carboxylated polyoxyethylene tridecyl ether, sodium polyoxyethylene lauryl ether sulfate, triethanolamine polyoxyethylene lauryl ether sulfate, sodium polyoxyethylene alkyl ether sulfate, sodium polyoxyethylene alkyl ether sulfate, sodium alkylsulfate, and triethanolamine alkylsulfate, but is not limited thereto.

The above anionic substance is used in an amount in the range preferably from 0.05% to 10%, more preferably from 0.05% to 5% by weight based on the total weight of the ink.

(Self-dispersible Pigment)

The pigment useful for the anionic ink includes self-dispersible type pigments which are dispersible in water or an aqueous medium without a dispersant. The dispersible type pigment has, on the surface, at least one kind of hydrophilic group bonded thereto directly or through another linking atomic group. The anionic hydrophilic group includes the atomic groups shown below.

—COOM, —SO$_3$M, —SO$_2$NH$_2$, —PO$_3$HM, —PO$_3$M$_2$
(where M Represents a Hydrogen Atom, Alkali Metal, Ammonium, or Organic Ammonium)

The linking atomic group includes also alkyl groups of 1 to 12 carbon atoms, substituted or unsubstituted phenyl groups, and substituted or unsubstituted naphthyl groups.

The anionically charged carbon black by introduction of a hydrophilic group onto the surface thereof exhibits high water-dispersibility by repulsion of the ions, so that it keeps stable dispersion state in an aqueous ink without addition of a dispersant.

(Basic Substance)

The anionic ink in this embodiment may contain a basic substance. The basic substance controls the pH of the ink itself, and further serves, on mixing of the ink and the liquid composition on the recording medium in a liquid state, to promote destruction of dispersion of the cationic fine particles in the liquid composition. This basic substance is not specially limited, provided that it gives a prescribed pH in combination with the coloring material used and promotes destruction of dispersion of the cationic fine particles in combination with the liquid composition. The basic substance may be selected from organic and inorganic substances without limitation. The basic substance having a lower dissociation constant in the ink is preferred, because the lower the dissociation degree of the basic substance in the ink, the more effectively is the pH of the ink controlled and the dispersion of fine particles in the liquid composition destructed.

The basic substance includes specifically sodium hydroxide, lithium hydroxide, sodium carbonate, ammonium carbonate, ammonia, sodium acetate, ammonium acetate, morpholine; alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine, and triisopropanolamine; and basic amino acids such as lysine and arginine.

In this embodiment, the aforementioned compound is preferably added appropriately to the ink to impart a buffer capacity for the hydrogen ion concentration. Specifically, on mixing the liquid composition with the ink in a liquid-liquid state, the pH of the liquid mixture is preferably in the alkaline region for effective aggregation of the fine particles in the liquid composition. The buffer capacity of the ink retards the shift of the pH of the liquid mixture to the neutral region on mixing with the liquid mixture.

(Additive to Ink)

In addition to the above-mentioned components, there may be added a surfactant, a defoaming agent, an antiseptic, and the like to obtain the intended properties of the ink as necessary. A commercial water-soluble dye may be added further.

The surfactant includes anionic surfactants such as fatty acid salts, higher alcohol sulfate ester salts, liquid fatty oil sulfate ester salts, and alkylallylsulfonate salts; and nonionic surfactants such as polyoxyethylene alkyl ethers, polyoxyethylene alkyl esters, polyoxyethylene sorbitan alkyl esters, acetylene alcohol, and acetylene glycol. One or more thereof may be suitably selected and used in an amount ranging from 0.01% to 5% by weight based on the total weight of the ink, depending on the amount of the added dispersant. The amount of the surfactant is preferably decided to obtain the surface tension of the ink not lower than 30 mN/m (dyn/cm) to prevent effectively twisted printing (deviation of ink landing points), or the like abnormal printing caused by wetting of the nozzle tip.

In preparation of the aforementioned pigment ink, a pigment is added to an aqueous solution containing at least a dispersing resin and water; the mixture is stirred and then dispersed by a dispersion means described later, and centrifuged if necessary to obtain an intended liquid dispersion; thereafter the aforementioned additive components are further added to the dispersion and the mixture is stirred to obtain the ink.

In the case where an alkali-soluble resin is employed, a base should be added to dissolve the resin. The amount of the amine or base to be added for the dissolution of!the resin should be equal to or larger than the amount calculated from the acid value of the resin. The amount of the amine or base is calculated by the equation below:

$$W=(A \times M \times R)/5600$$

where W is the amount of the amine or base (grams), A is the acid value of the resin, M is the molecular weight of the amine or base, and R is the amount of the resin (grams).

In the above ink preparation, the aqueous solution containing the pigment before the dispersion treatment is preferably pre-mixed for 30 minutes or more, whereby the dispersion efficiency is improved. This premixing treatment improves the wettability of the surface of the pigment to promote adsorption of the dispersant by the pigment surface.

The base to be added to the dispersion containing an alkali-soluble type resin is selected preferably from organic bases such as monoethanolamine, diethanolamine, triethanolamine, amine methylpropanol, and ammonia; and inorganic amines such as potassium hydroxide, and sodium hydroxide.

The dispersing machine employed in preparation of the pigment ink may be any of conventional dispersing machines such as ball mills and sand mills. Of the dispersing machines, high-speed sand mills are preferred, such as Super Mill, Sand Grinder Mill, Beads Mill, Agitator Mill, Gren Mill, Dainol Mill, Pearl Mill, and Cobol Mill (trade names).

The ink used in the present invention may contain in addition to the above components a further additive such as a water-soluble organic solvent, a surfactant, a pH controller, a rust-preventive, a fungicide, an antioxidant, an evaporation promoter, a chelating agent, and a water-soluble polymer.

The liquid medium for dissolving or dispersing the above coloring material in the present invention is preferably a mixture of water with a water-soluble organic solvent. The water-soluble organic solvent includes specifically alkyl alcohols of 1 to 4 carbons such as methyl alcohol, ethyl alcohol, n-propyl alcohol, isopropyl alcohol, n-butyl alcohol, s-butyl alcohol, and t-butyl alcohol; amides such as dimethylformamide, and dimethyl acetamide; ketones such as acetone; ethers such as tetrahydrofuran, and dioxane; polyalkylene glycols such as polyethylene glycol, and polypropylene glycol; polyols having alkylene of 2 to 6 carbons such as ethylene glycol, propylene glycol, butylene glycol, triethylene glycol, 1,2,6-hexanetriol, thiodiglycol, hexylene glycol, and diethylene glycol; glycerin; lower alkyl ethers of a polyhydric alcohol such as ethylene glycol monomethyl (or monoethyl) ether, and diethylene glycol methyl (or ethyl) ether; cyclic amides such as N-methyl-2-pyrrolidone, and 1,3-dimethyl-2-imidazolidinone; sulfolane; dimethylsulfoxide; 2-pyrrolidone; $\epsilon$-caprolactam; and imide compounds such as succinimide.

The content of the water soluble organic solvent is generally in the range from 1% to 40%, preferably from 3% to 30% by weight based on the total weight of the ink. The content of water in the ink is preferably in the range from 30% to 95% by weight. When the content is less than 30% by weight, the solubility of the coloring material is poor and the viscosity of the ink becomes higher and is not preferable. On the other hand, when the content is more than 95% by weight, sufficient sticking property is not satisfactory.

The anionic ink used in the present invention is useful for water-based writing tools, and is particularly suitable for use in an ink-jet recording system which ejects the ink by bubbling of the ink by thermal energy. In the ink-jet recording, the ink of the present invention is ejected highly stably without forming satellite dots. For use for the ink-jet recording, the thermal properties such as specific heat, thermal expansion coefficient, and thermal conductivity may be adjusted.

[Cationic Ink]

The aqueous cationic ink is explained which constitutes an ink set in combination with a anionic liquid composition mentioned above. The ink set herein means a combination of the liquid composition of the present invention with at least one cationic ink containing a cationic substance. A combination of one or more inks without the liquid composition of the present invention is called "an ink sub-set". The cationic ink used in the present invention contains a water-soluble dye having a cationic group, or contains a pigment as a coloring material and a cationic compound. The above ink may further contain water, a water-soluble organic solvent, and an additive such as a viscosity controller, a pH controller, an antiseptic, a surfactant, and an antioxidant, as necessary. The constituting components of the ink are explained below.

(Water-soluble Dye)

The water-soluble dye having a cationic group used in the present invention may be selected from water-soluble dyes listed in Color Index without limitation. Any dyes having a cationic group may be used even if it is not listed in Color Index. The water-soluble dye includes also those which have a pH-depending solubility.

(Pigment)

The aqueous ink of another type may contain a pigment and a cationic compound in place of the above-mentioned aqueous dye having a cationic group, and additionally water, and a water-soluble organic solvent, and an additive such as a viscosity controller, a pH controller, an antiseptic, a surfactant, and an antioxidant, as necessary. The cationic compound may be a dispersant for the pigment. If the dispersant for the pigment is not cationic, a cationic compound may be added to the dispersant. Naturally to the cationic dispersant, another cationic compound may be added. The pigment useful in this cationic ink is not limited, and the pigment mentioned before for use for the anionic ink are useful also for the cationic ink.

(Pigment Dispersant)

The dispersant for the pigment of the ink of the present invention may be any water-soluble resin which has a function of dispersing stably the pigment in the presence of a cationic group in water or an aqueous medium. A specific example is a polymer which is produced by vinyl monomer polymerization and at least a portion of the polymer molecule is cationic. The cationic monomer for constituting the cationic sites includes salts of the tertiary amine monomers below and quaternized products thereof, the monomer including: N,N-dimethylaminoethyl methacrylate [$CH_2=C(CH_3)-COO-C_2H_4N(CH_3)_2$], N,N-dimethylaminoethyl acrylate [$CH_2=CH-COO-C_2H_4N(CH_3)_2$], N,N-dimethylaminopropyl methacrylate [$CH_2=C(CH_3)-COO-C_3H_6N(CH_3)_2$], N,N-dimethylaminopropyl acrylate [$CH_2=CH-COO-C_3H_6N(CH_3)_2$], N,N-dimethyl acrylamide [$CH_2=CH-CON(CH_3)_2$], N,N-dimethyl methacrylamide [$CH_2=C(CH_3)-CON(CH_3)_2$], N,N-dimethylaminoethyl acrylamide [$CH_2=CH-CONHC_2H_4N(CH_3)_2$], N,N-dimethylaminoethyl methacrylamide [$CH_2=C(CH_3)-CONHC_2H_4N(CH_3)_2$], N,N-dimethylaminopropyl acrylamide [$CH_2=CH-CONHC_3H_6N(CH_3)_2$] and N,N-dimethylaminopropyl methacrylamide [$CH_2=C(CH_3)-CONHC_3H_6N(CH_3)_2$].

The tertiary amine is converted to its salt by using a salt-forming compound such as hydrochloric acid, sulfuric acid, acetic acid, and the like. The compound for quaternization includes methyl chloride, dimethyl sulfate, benzyl chloride, and epichlorohydrin. Of these, methyl chloride, dimethyl sulfate, and so forth are preferred in preparing the dispersant used in the present invention. The tertiary amine, or the quaternary amine behaves as a cation in water, and in the neutralized amine is dissolved stably in an acidic medium. The content of the above monomer in the copolymer is preferably in the range from 20% to 60% by weight.

The other monomer for constituting the polymeric dispersant includes hydroxy group-containing acrylate esters such as 2-hydroxyethyl methacrylate, and acrylate esters having a long ethylene oxide side chain; hydrophobic monomers such as styrene type monomers; and water-soluble monomers soluble in water at or near pH 7.0 such as acrylamides, vinyl ethers, vinylpyrrolidone, vinylpyridines, and vinyloxazolines. The hydrophobic monomer includes styrene and its derivatives, vihylnaphthalene and its derivatives, alkyl (meth)acrylates, and acrylonitrile. The polymeric dispersant prepared by copolymerization contains the water-soluble monomer at a content ranging preferably from 15% to 35% by weight for stable dissolution of the copolymer in the aqueous solution, and the hydrophobic monomer at a content ranging preferably from 20% to 40% by weight for raising the effect of the copolymer on dispersing the pigment.

(Self-dispersible Pigment)

The cationically charged carbon black has one or more kinds of hydrophilic groups bonded directly or indirectly through a linking group. The hydrophilic group includes the quaternary ammonium group shown below, but is not limited thereto in the present invention.

—$SO_2N^+H_3$
—$SO_2N^+H_2COR$
—$N^+H_3$
—$N^+R_3$

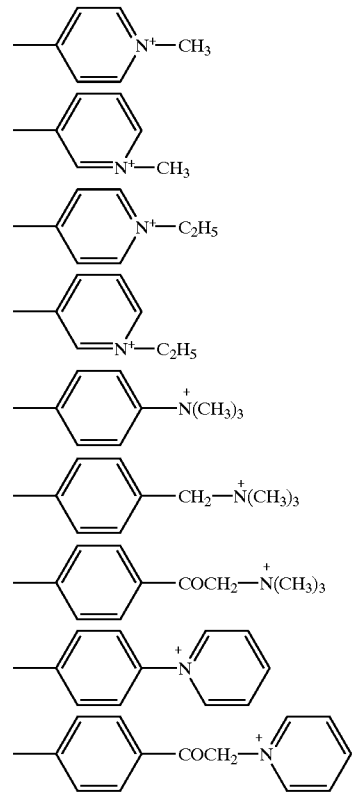

In the above formula, R represents linear or branched alkyl of 1 to 12 carbons, substituted or unsubstituted phenyl, or substituted or unsubstituted naphthyl. The cationic group has a counter-ion such as $NO_3^-$, and $CH_3COO^-$.

The cationically charged self-dispersible carbon black can be produced by bonding a hydrophilic group exemplified above. For example, the N-ethylpyridyl group shown below is bonded to the carbon black by treating the carbon black with 3-amino-N-ethylpyridinium bromide.

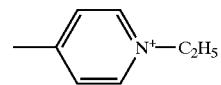

The carbon black, which is cationically charged by introduction of a hydrophilic group onto the surface, has high water-dispersibility owing to ionic repulsion, and keeps stable dispersion state in an aqueous ink without a dispersant.

(Surface Tension of Ink)

The surface tension of the cationic ink itself is adjusted preferably in the range from 30 to 68 mN/m (dyn/cm) at 25° C., and the viscosity of the cationic ink itself is adjusted preferably to be not higher than 15 mPa (cP), more preferably not higher than 10 mPa (cP), still more preferably not higher than 5 mPa (cP) at 25° C. for higher penetrativity into the recording medium such as plain paper and for improved matching with an ink-jet head.

(Concentration of Aqueous Ink)

The concentration of the coloring material in the anionic ink or the cationic ink is selected depending on the kind of the coloring material, an aqueous dye, a pigment, or a self-dispersible pigment, and is preferably in the range from 0.1% to 20%, more preferably from 0.1% to 12% by weight of the ink. With regard to the relationship between the concentration of fine particles in the liquid composition and the concentration of the coloring material in the ink, at the concentration ranging from 0.3% to 7% by weight and at the ratio of the concentrations of the coloring material in the ink to the fine particles in the liquid composition of not higher than 1.2, more preferably not higher than 1.0 by weight, the coloring property of the image is excellent in usual two-liquid printing.

COLORED AREA FORMATION ON RECORDING MEDIUM

The method of formation of a colored area according to the present invention is described below. The method of formation of a colored area of the present invention, comprises (i) a step for applying an anionic or cationic aqueous ink containing a coloring material, and (ii) a step for applying a liquid composition containing fine particles surface charged oppose to the polarity of the ink in a dispersion state, in the surface of the recording medium, the aqueous ink and the liquid composition are brought into contact with each other in a liquid state. The method for application of the liquid composition and the ink constituted as mentioned above is explained below.

The method for forming a colored area on a recording medium of the present invention comprises (ii) the step for applying the liquid composition as mentioned above onto the recording medium, and (i) the step for applying an anionic or cationic aqueous ink containing coloring material onto a recording medium, the liquid composition is applied onto a colored area formation region or onto the colored area formation region and vicinity thereof, and the aqueous ink is applied to the colored area formation region so as to come into contact with the liquid composition in a liquid-liquid state. Here, the colored area formation region signifies a region to which the ink dot is applied, and the vicinity thereof signifies a region within the range of about 1–5 dot size outside from the region where the ink dot is to be applies.

In the method of colored area formation onto the recording medium of the present invention, the liquid composition and the ink may be applied in any method, provided that the liquid composition and the ink are brought into contact with each other in a liquid state. Therefore, either one may be applied first. For example, the step (ii) may be conducted first, and the step (i) later. Otherwise, the step (i) may be conducted first, the step (ii) second, and then the step (i) again. That is, the applied order of the ink and the liquid composition onto the recording medium does not cause substantial differences so long as the liquid-liquid mixture onto the recording medium can be attained. In the case where the liquid composition is applied first on a recording medium, the time before the application of the ink thereon is not specially limited. However, for liquid contact of both to occur, the ink is preferably applied nearly at the same time, or within several seconds on the recording medium.

In the present invention, the liquid composition and the ink are preferably adjusted to give a liquid mixture having a total concentration of the fine particles and the coloring material in the range not lower than 0.5% by weight on mixing of on a recording medium. The total concentration of the fine particles and the coloring material can be estimated from the fine particle concentration in the liquid composition, the coloring material concentration in the ink, the amounts of the liquid composition and the ink applied for formation of the colored area. At the total concentration of 0.5% or higher by weight of the coloring material and the fine particles in the liquid mixture, the adsorption reaction ratio of the coloring material and the fine particles is higher, which facilitates aggregation of fine particles containing the adsorbed coloring material to retain the aggregate in the vicinity of the surface of the recording medium. Thereby, penetration of the solvent component into the recording medium is promoted to retard ink bleeding at a colored area boundary. The colored area boundary is more sharply reproduced at the concentration of 1% or higher.

In the present invention, the weight ratio of the coloring material to the fine particles in the liquid mixture formed by mixing on the recording medium ranges preferably from 0.005 to 10 (coloring material/fine particles). The weight ratio (coloring material/fine particles) in the liquid mixture can be estimated from the amounts of application and the concentrations of the liquid composition and the ink in the colored area formation region. Within the aforementioned range of the weight ratio of the coloring material to the fine particles, the coloring material is adsorbed effectively by the surface of the fine particles to form a sharp image with higher reproducibility of the boundary part with less boldness of letters and less dot feathering.

(Recording Medium)

The recording medium for the colored area formation of the present invention is not limited specially. Conventional plain paper sheets such as copying paper sheets, and bond paper sheets are suitably used. Naturally, also useful are coat paper sheets specially produced for ink-jet recording, transparent films for OHP, usual wood-free paper sheets, and glossy paper sheets.

(Method of Application of Liquid Composition)

The liquid composition may be applied by a sprayer or a roller onto the entire face of the recording medium. However, the liquid composition is applied preferably by ink-jet system by which the liquid composition can be applied selectively only to colored area-forming regions where the ink is to be applied, or to the colored area-forming region and vicinity thereof. The various ink-jet recording systems can be employed. Of these, particularly suitable is the ink-jet recording system which ejects liquid droplets by action of bubble generated by thermal energy.

INK-JET RECORDING APPARATUS

The ink-jet recording apparatus is explained below. The ink-jet recording apparatus for the present invention is equipped with an ink container for storing a cationic or anionic aqueous ink containing a coloring material, a first recording unit having a first ink-jet head for ejecting the ink, a liquid composition container for storing a liquid composition containing fine particles electrically charged in the polarity opposite to that of the aqueous ink in a dispersion state, and a second recording unit having a second ink-jet head for ejecting the liquid composition. Another type of the ink-jet recording apparatus is equipped with an ink container for storing a cationic or anionic aqueous ink containing a coloring material, a liquid composition container for storing a liquid composition containing fine particles electrically charged in the polarity opposite to that of the aqueous ink in a dispersion state, and a recording unit having a ink-jet head for ejecting the aqueous ink stored in the ink container and the liquid composition separately and independently. The ink-jet recording apparatus is explained below more specifically.

Figure 1:
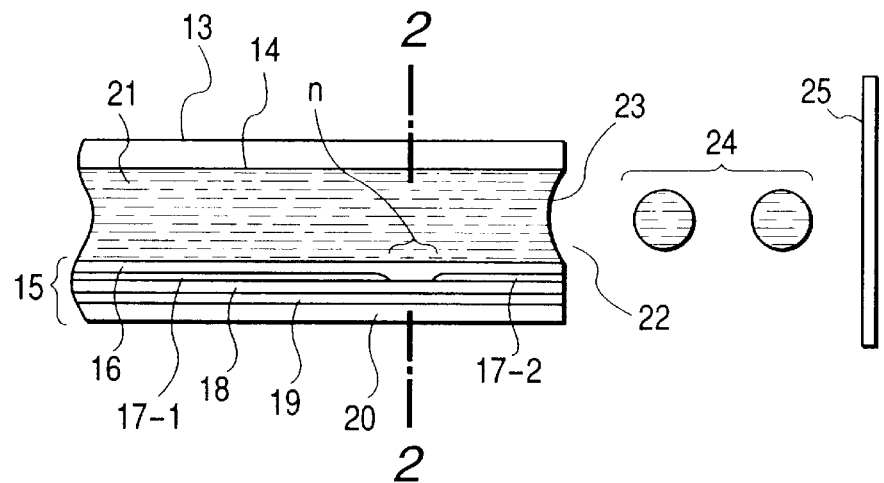
FIG. 1 is a vertical sectional view of a head of an ink-jet recording apparatus.
Figure 3:
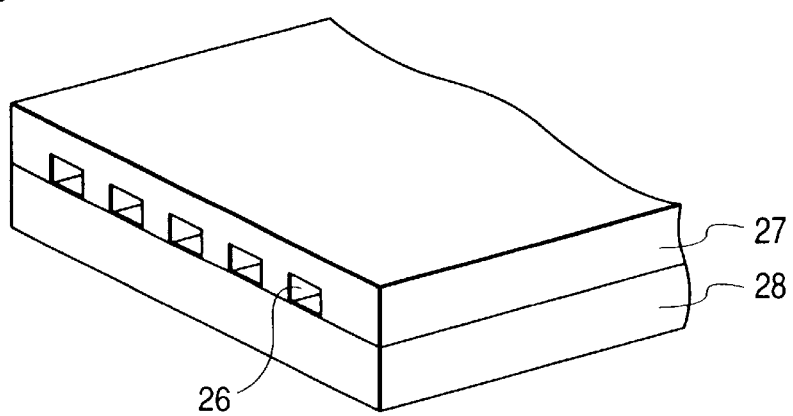
FIG. 3 is a perspective external view of the head of the ink-jet recording apparatus.

In the present invention, the ink-jet recording apparatus particularly preferred is of a type which ejects liquid droplets by thermal energy generated in correspondence with recording signals given to the recording head. FIGS. 1, 2, and 3 show an example of constitution of a head, the main part of the apparatus. FIG. 1 is a sectional view of a head 13 along an ink flow path. FIG. 2 is a sectional view of the head taken along line 2—2 in FIG. 1.

The recording head 13 is constructed by bonding a plate of glass, ceramics, plastics, or the like having a groove 14 for ink flow with a heating head 15 for thermosensitive recording (not limited to the thin film head shown in the drawing). The heating head 15 is constituted of a protection layer 16 formed from silicon oxide, or the like; aluminum electrodes 17-1, 17-2; a heating resistor layer 18 formed from nichrome or the like; a heat-accumulating layer 19; and a substrate 20 made of a heat-radiating material such as alumina.

A recording ink 21 reaches an ejection orifice 22, and forms there a meniscus 23 by Pressure P. On application of an electric signal information to the electrodes 17-1, 17-2 of the head 13, the region denoted by a symbol n on the heating head 15 generates heat abruptly to form a bubble in the ink there, the pressure of the bubble pushes out the meniscus 23 to eject the ink 21 through the ejection orifice 22 in a shape of droplets 24. The ejected ink droplet travels toward a recording medium 25.

FIG. 3 shows a external appearance of a multi-head having juxtaposed plural heads shown in FIG. 1. The multi-head is formed by bonding a glass plate 27 having multi-nozzles 26 with a heat-generating head 28 like the one shown in FIG. 1.

Figure 4:
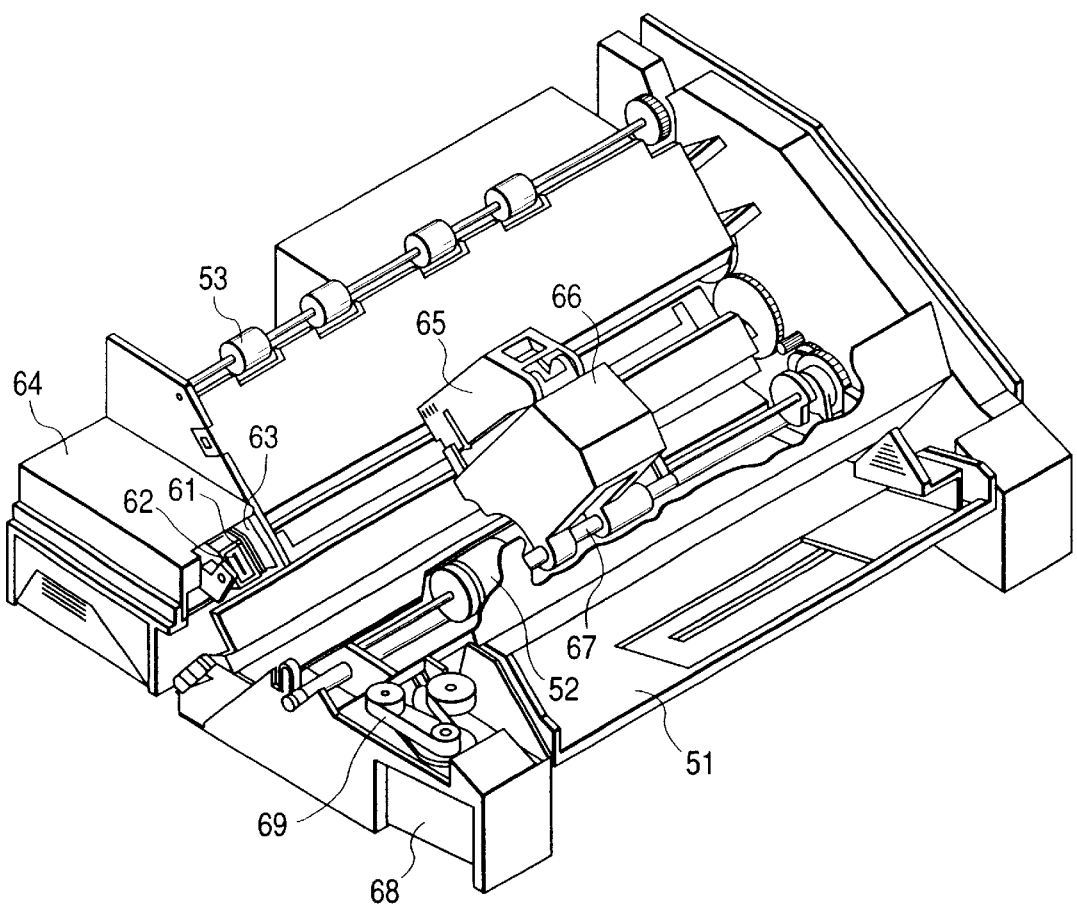
FIG. 4 is a perspective view of an ink-jet recording apparatus.

FIG. 4 shows an example of the entire of the ink-jet recording apparatus equipped with such a head. In FIG. 4, a blade 61 as a wiping member is held at one end of the blade by a blade-holding member, forming a fixed end in a shape of a cantilever. The blade 61 is placed at a position adjacent to the recording region of the recording head, and is held, in this example, so as to protrude into the moving path of the recording head. A cap 62 for capping the projected opening face is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head 65 in a manner similar to that of the blade 61. The blade 61, the cap 62, and the ink absorbent 63 constitute an ejection recovery device 64. The blade 61, and the ink absorbent 63 serve to remove off water, dust, and the like from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper sheet delivery device 51 for delivery of a recording medium and a paper sheet delivery roller 52 driven by a motor (not shown in the drawing) deliver a recording medium to the position opposing to the ejection nozzle face of the recording head. With the above constitution, the recording medium is delivered to the front of the ejection orifice of the recording head 65 with the progress of the recording, and is delivered further to a paper discharge device provided with paper sheet-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the recording head 65 is moved from the home position to the record-starting position, the cap 62 and the blade 61 are at the same position as in the above-mentioned wiping step, so that the ejection nozzle face of the recording head 65 is wiped also in this movement. The recording head 65 is moved to the home position not only at the completion of the recording and at the time of ejection recovery, but is moved also at a predetermined time intervals during recording from the recording region. The nozzle is wiped by this movement.

Figure 5:
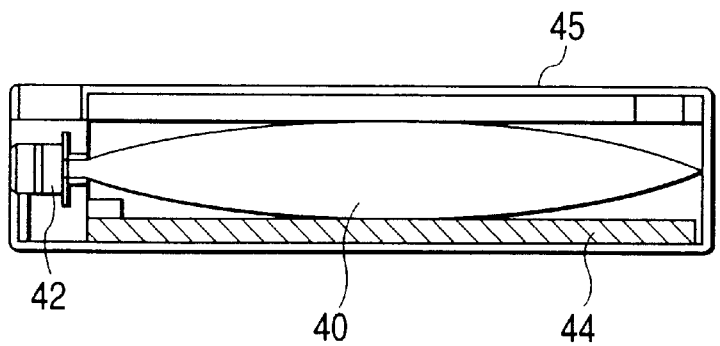
FIG. 5 is a vertical sectional view of an ink cartridge.

FIG. 5 shows an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb waste ink. The liquid-contacting face of the ink container is preferably formed from polyolefin, especially polyethylene, in the present invention. Another embodiment of the cartridge of the present invention has two containers for storing an ink for constituting the ink set of the present invention and the liquid composition separately, detachable from the head for ejecting the ink and the liquid composition, and capable of supplying the ink and the liquid composition to the recording head.

Figure 10:
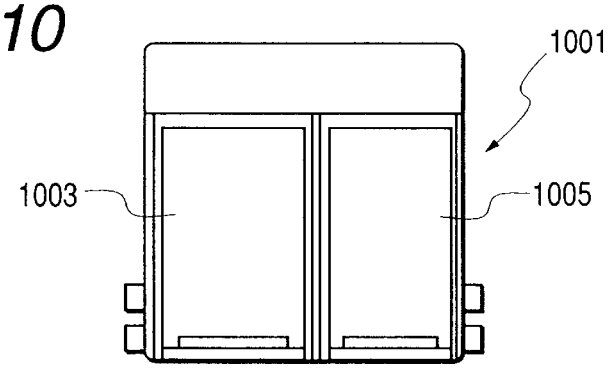
FIG. 10 is a rough sketch of an embodiment of an ink cartridge of the present invention.
Figure 11:
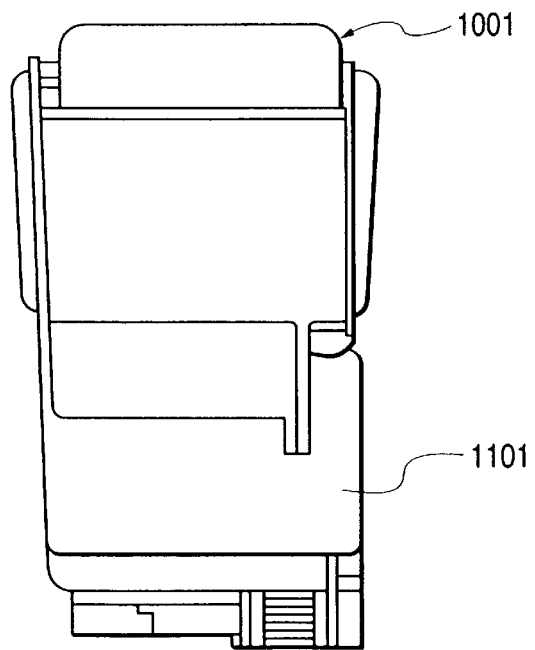
FIG. 11 is a rough sketch of a recording head equipped with the ink cartridge shown in FIG. 10.

FIG. 10 shows such a cartridge 1001, comprising an ink container 1003 for storing the ink, and a liquid composition container 1005. The cartridge is constituted as shown in FIG. 11 so as to be detachable from a recording head 1101, and the cartridge 1001 attached to the recording head feeds the liquid composition and the ink to the recording head 1101.

The ink-jet recording apparatus used in the present invention is not limited to the above-mentioned one which has separately a head and an ink cartridge. Integration thereof as shown in FIG. 6 may suitably be employed.

Figure 6:
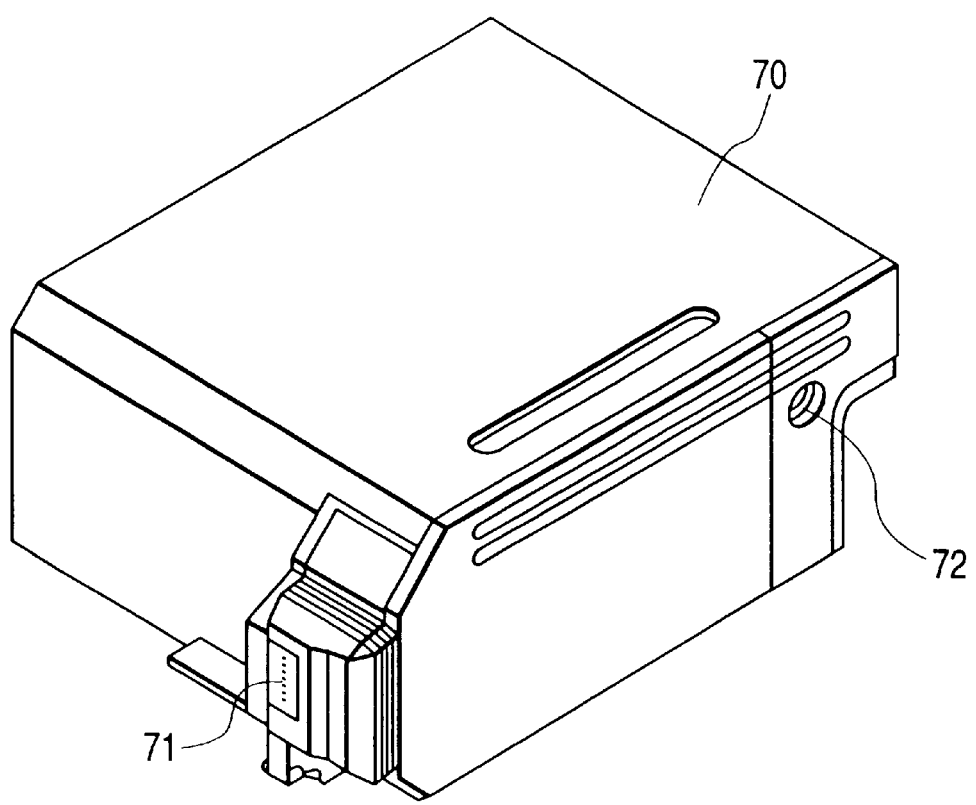
FIG. 6 is a perspective view of a recording unit.

In FIG. 6, a recording unit 70 houses an ink absorbing member such as an ink absorbent, and the ink in the absorbent is ejected through a plurality of orifices of a head 71. The ink absorbent is made preferably of a resin such as polyurethane. An air communication hole 72 allows the interior of the recording unit to communicate with the open air. This recording unit 70 is used in place of the recording head shown in FIG. 4, and is detachable from the carriage 66.

Figure 12:
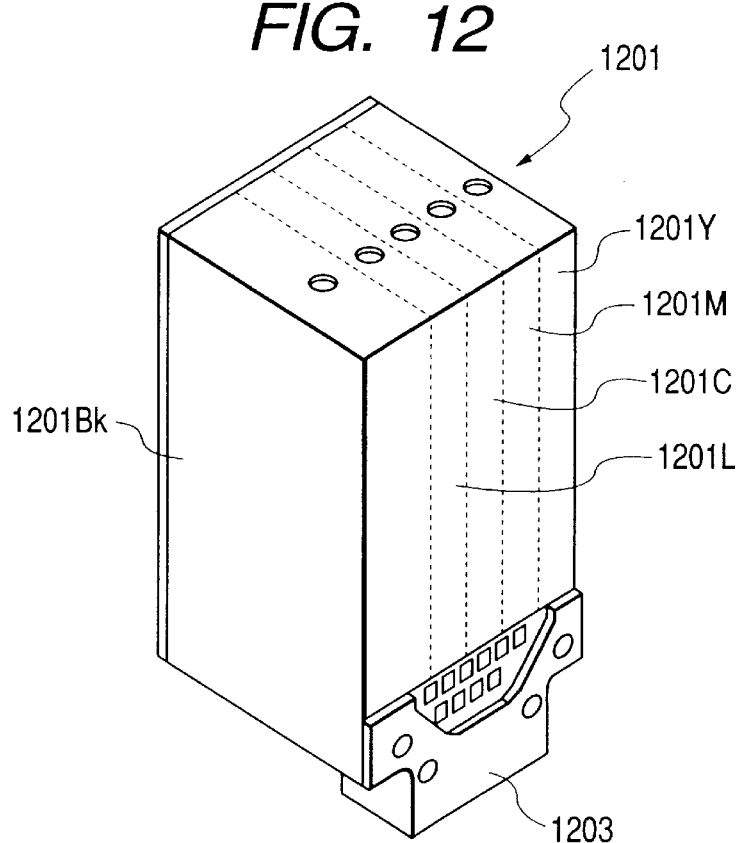
FIG. 12 is a rough sketch of an embodiment of a recording unit of the present invention.

A recording unit of another embodiment of the present invention is constructed by integration of an ink tank having container portions for storing respective inks and a liquid composition, and a recording head for ejecting the inks and the liquid composition separately. Specifically, as shown in FIG. 12, the recording unit 1201 is constructed in integration of a first container portion 1201L for the liquid composition, a second container portion 1201Bk for black ink, color ink container portions 1201Y, 1201M, and 1201C for yellow, magenta, and cyan color inks; and a recording head 1203 having separate flow paths for the respective inks.

In the above description, an ink-jet recording apparatus is used as an example which ejects ink droplets by action of thermal energy on the ink and the liquid composition. However, a piezo type ink-jet recording apparatus employing a piezo element is also useful.

Figure 7:
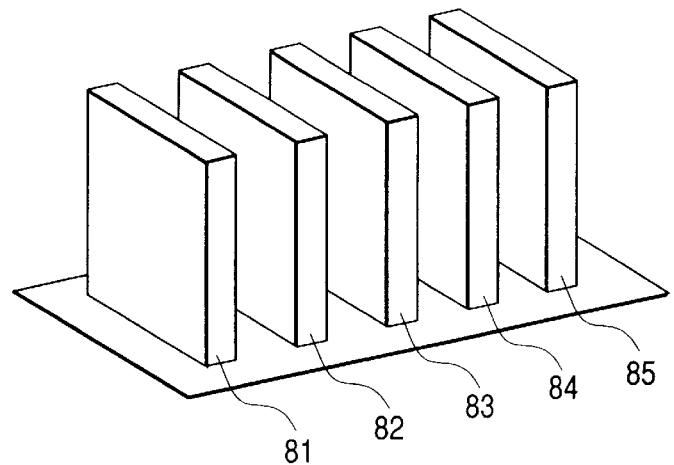
FIG. 7 is a perspective view of a recording unit having plural recording heads employed in an example of the present invention.
Figure 8:
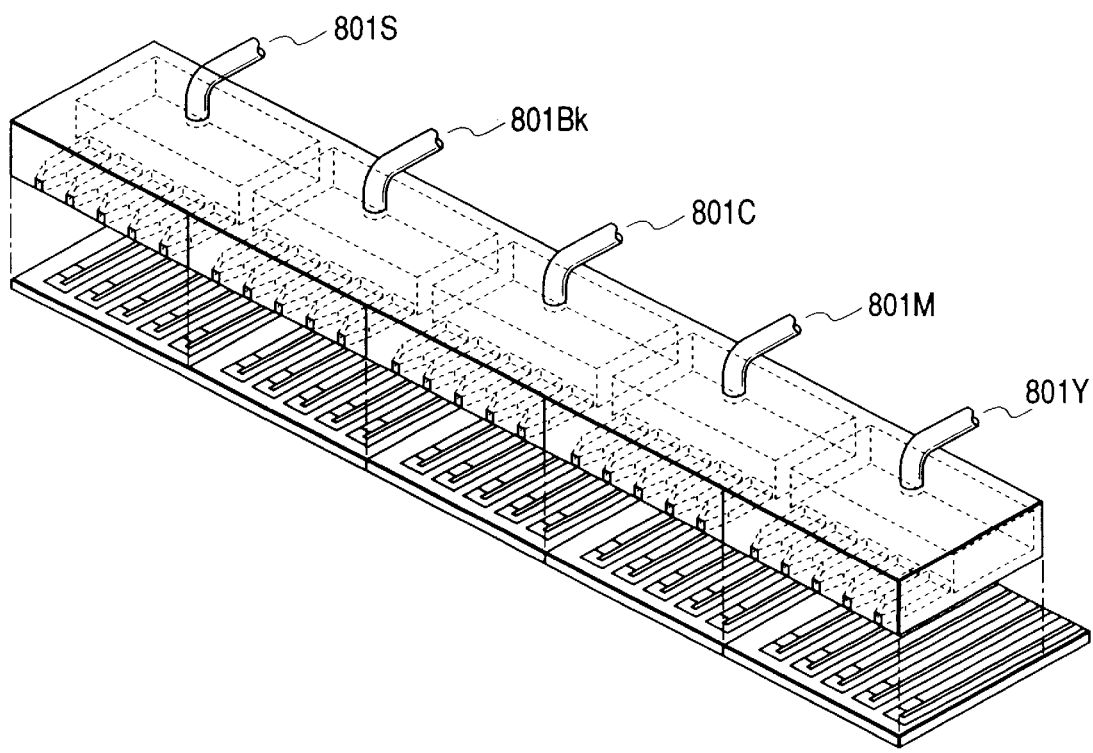
FIG. 8 is a perspective view of another recording head employed in the present invention.
Figure 9:
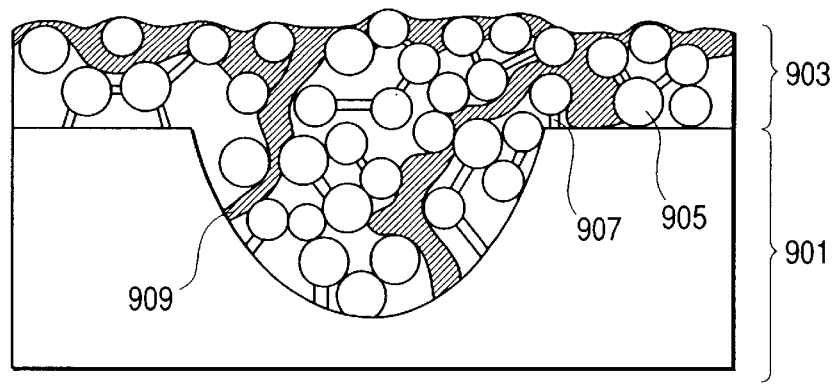
FIG. 9 is a schematic sectional view illustrating a state of a colored portion formed by ink-jet recording on a coat paper sheet.

For formation of the colored areas on a recording medium according to the present invention, a recording apparatus shown in FIG. 3, for example, is employed which has five recording heads on a carriage. FIG. 7 shows an example thereof. In FIG. 7, the recording heads 81, 82, 83, 84 eject respectively recording inks of yellow, magenta, cyan, or black, and the head 85 ejects the liquid composition used in the present invention. The heads are set in the above described recording apparatus and eject the recording inks of respective colors in accordance with recording signals. The liquid composition used in the present invention is applied, before the color ink ejection, at least on the region where the inks are to be deposited on the recording paper sheet. FIG. 7 shows an example of use of five recording heads, but the recording head is not limited thereto. FIG. 8 shows a preferred example of one recording head which has separate liquid flow paths for yellow 801Y, magenta 801M, cyan 801C, black 801Bk, and the colorless liquid composition 801S. Naturally, the heads may be arranged to change the recording order reverse to that mentioned above.

Figure 15:
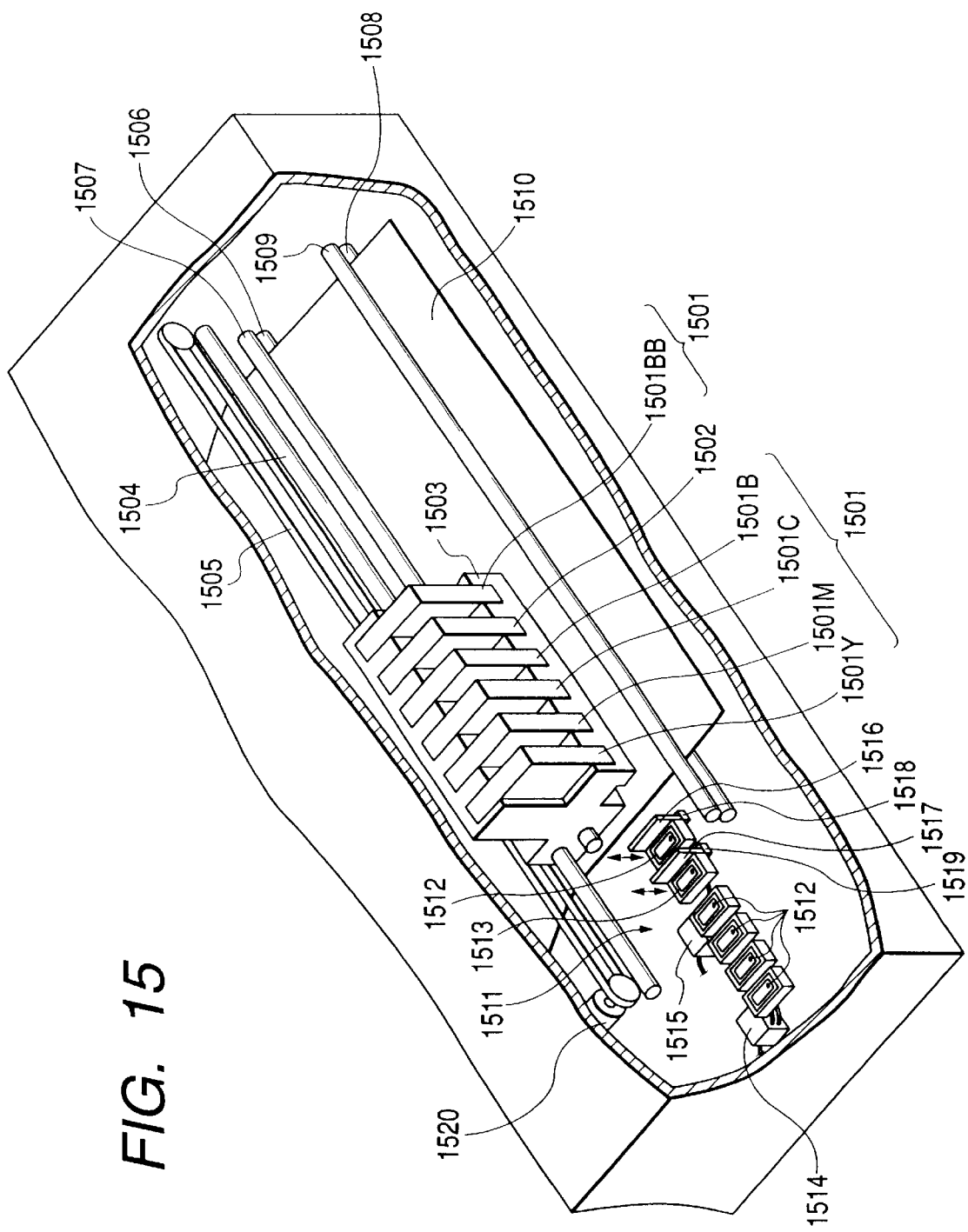
FIG. 15 is a partially exploded schematic perspective view of an embodiment of an ink-jet recording apparatus of the present invention.

FIG. 15 is a schematic perspective view of another embodiment of the ink-jet recording apparatus of the present invention.

In FIG. 15, a scanning rail 1504 extends in the scanning direction of a carriage 1503 and supports the carriage slidably. A driving belt 1505 transmits driving force to the carriage 1503 for reciprocating movement. Delivery roller pairs 1506, 1507, and 1508, 1509 are placed respectively on the front side and the rear side of the printing position to catch and deliver a recording medium 1510. The recording medium 1510 like a paper sheet is guided and supported by a platen (not shown in the drawing) in a press-contact state to keep the printed face flat. Head cartridges (heads) 1501, 1502 mounted on the carriage 1503 have ejection-orifice forming faces projecting downward from the carriage 1503 between the recording medium delivery rollers 1507, 1509 to oppose parallel the recording medium 1510 pressed to the guide face of the platen (not shown in the drawing).

In FIG. 15, six head cartridges in total are mounted on the carriage 1503. In this example, a yellow print head 1501Y, a magenta print head 1501M, a cyan print head 1501C, a first black print head 1501B, a liquid composition ejection head 1502, and a second black print head 1501BB are arranged in the named order from left to right on the carriage 1503. The liquid composition ejection head 1502 ejects the liquid composition reactive to the dye in the ink onto the recording medium 1510. The second black print head 1501BB at the rightmost position is used at the return scanning in reciprocating printing. Thus the liquid composition ejection head 1502 is placed next to (at the right side of) the black print head 1501B, and next to it (at the rightmost position) the second black print head 1501BB is placed.

In FIG. 15, a recovery unit 1511 is placed at the left side of the printing region. In the recovery unit 1511, caps 1512 for capping the print heads 1501Y, 1501M, 1501C, 1501B are placed successively from left to right in correspondence with the arrangement of the head cartridge 1501, 1502. Adjacently thereto (at the right side), a cap 1513 is placed for capping the liquid composition ejection head 1502, and further at the right side thereof (at the rightmost position), a cap 1512 is placed for capping the second black print head 1501BB. The respective caps are movable upward and downward. When the carriage is at the home position, the caps 1512, 1513 are respectively allowed to press the orifice face of the heads 1501, 1502 to close tightly (to cap) the ejection orifices to prevent evaporation of the ink solvent at the ejection orifices, preventing viscosity increase and or solidifying of the inks and preventing the ink ejection failure.

The recovery unit 1511 is equipped with a suction pump 1514 communicating with the respective caps 1512, and a suction pump 1515 communicating with the cap 1513. When the ejection at the print head 1501, or the liquid composition ejection head fails, the pump 1514 or 1515 sucks the ejection orifice face to recover with capping with the cap 1512 or 1513. A blade 1517 for the liquid composition-ejection head 1502 is placed between the fifth cap 1513 from the left for the liquid composition and the sixth cap 1512 from the left (rightmost position). A blade 1516 for the print heads 1501 is placed at the right side (printing region side) of the rightmost cap 1512. The blade 1517 is held by a blade holder 1519, and the blade 1516 is held by a blade holder 1518. In this embodiment, the blade holder 1518, 1519 is respectively moved upward and downward by a blade-lifting mechanism (not shown in the drawing) driven by utilizing the movement of the carriage 1503, thereby being moved upward or downward to a protruding position (wiping position) to wipe off an ink and foreign matter adhering to the ejection orifice faces of the heads 1506, 1502, or to a position (standby position) not contacting with the ejection orifice face. In the blade movement, the blade 1516 for wiping the print heads and the blade 1517 for wiping the print heads 1501 are constructed to move independently from each other.

Figure 16A:
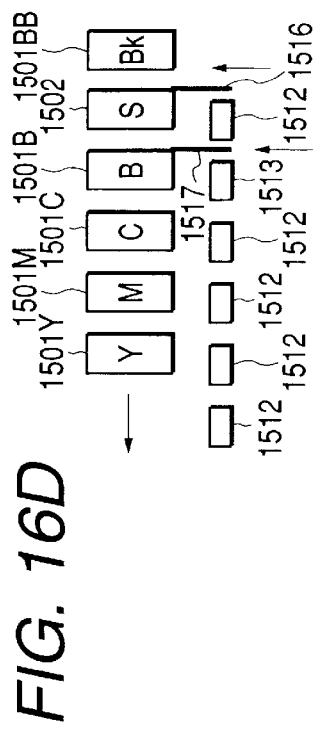
FIGS. 16A, 16B, 16C, 16D, 16E, and 16F are schematic drawings showing the operation of wiping in the ink-jet recording apparatus shown in FIG. 15.
Figure 16B:
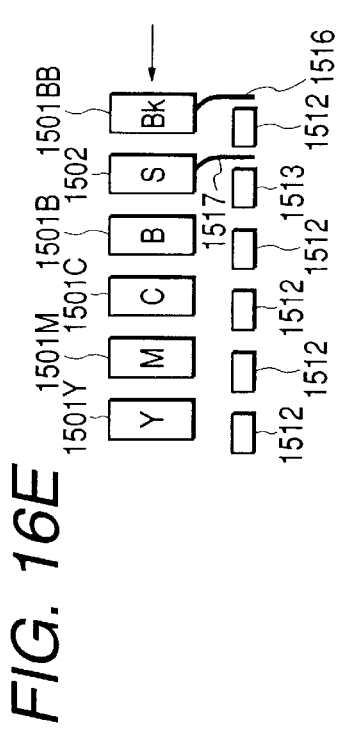
Figure 16C:
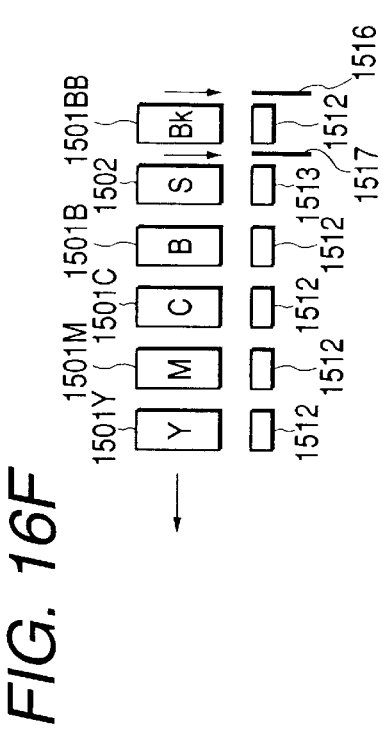
Figure 16D:
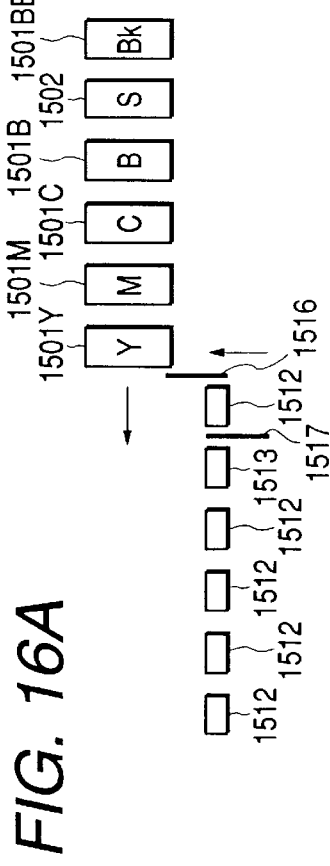
Figure 16E:
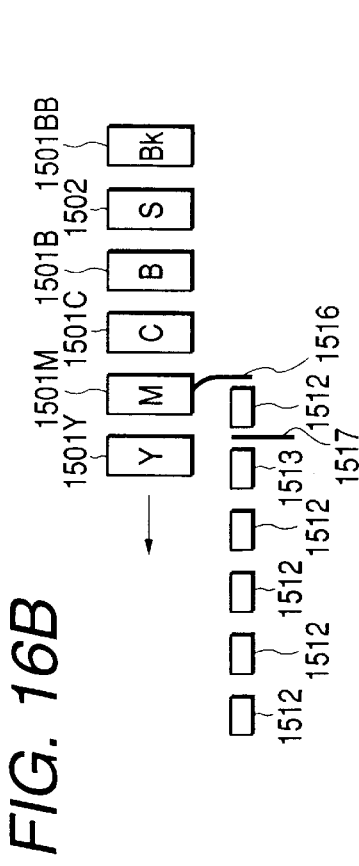
Figure 16F:
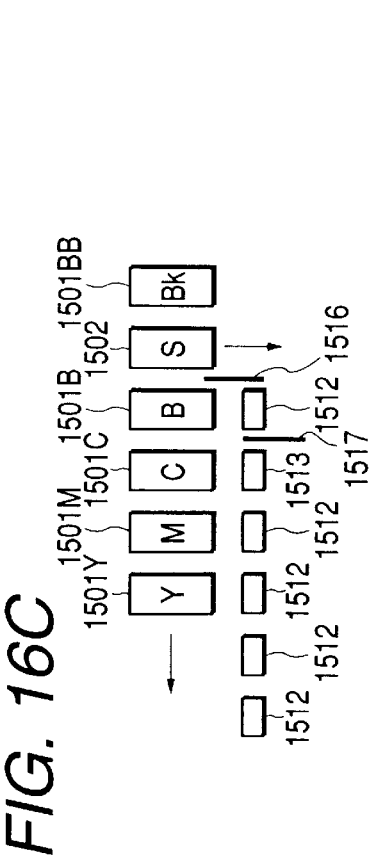

FIGS. 16A to 16F show schematically wiping operation in the ink-jet recording apparatus shown in FIG. 15. As shown in FIG. 16A, the blade 1516 for the print heads is allowed to protrude (to be lifted), and then the heads mounted on the carriage 1503 are moved from the right side toward the home position. The lifted blade 1516 for the print heads wipes the print heads 1506 successively with the leftward movement of the carriage 1503 as shown in FIG. 16B. At the time when the liquid composition ejection head 1502 has come to the left side of the blade 1516 for the print heads, the blade 1516 is moved backward (lowered) without contact with the liquid composition ejection head 1502 as shown in FIG. 16C. At the time when the liquid composition ejection head 1502 has passed the blade 1516 for the print heads, both the blade 1516 for the print heads and the blade 1517 for the liquid composition are allowed to protrude (to be lifted) as shown in FIG. 16D. Then, with leftward movement of the carriage 1503, the wiping of the liquid composition ejection head 1502 by the blade 1517 and the wiping of the rightmost print head 1501BB by the blade 1516 are simultaneously conducted as shown in FIG. 16E. When all of the heads 1501, 1502 have been wiped, as shown in FIG. 16F, the two blades 1516, 1517 are moved backward (lowered) to the standby position.

In the Example of FIGS. 15 and 16A to 16F, the wiping is conducted with the movement of the carriage 1503 from the print region side (right side) to the home position side (side of the recovery unit 1511). However, the direction of the wiping is not limited thereto, and the wiping may be conducted with the movement of the carriage from the home position side to the right side (print region side).

The ink-jet recording apparatus shown in FIG. 15 is constituted to eject a liquid composition of the present invention reactive to a coloring material of an ink through a liquid composition ejection head 1502 onto a recording medium 1510 and to cause reaction with an ink ejected through a print head 1501 on the recording medium 1510 to form a record. The reaction of the coloring material in the ink with the liquid composition on the recording medium 1510 causes adsorption of the coloring material in the ink in a monomolecular state onto the surface of the fine particles to form an image by the fine particles. Therefore, the formed image is excellent in coloring property and color uniformity.

As mentioned above, the present invention provides a liquid composition, an ink set, a method for formation of a colored area onto a recording medium and an ink jet recording apparatus to be capable of forming an ink-jet recorded image, in color ink-jet recording on a plain paper sheet, by keeping the texture of the plain paper sheet with coloring property and color uniformity comparable to that on ink-jet recording coat paper sheet with less stripy unevenness in a solid image with high rub-off resistance of the printed area. Further, the present invention provides the liquid composition having high storage stability, and stability in ejection through a recording head with excellent recording properties.

The present invention provides also an ink set comprising a liquid composition and a color ink, a method for formation of a colored area onto a recording medium and an ink jet recording apparatus to be capable of forming an ink-jet recorded image, in color ink-jet recording on a plain paper sheet, by keeping the texture of the plain paper sheet with coloring property and color uniformity comparable to that on ink-jet recording coat paper sheet with less stripy unevenness in a solid image with high rub-off resistance of the printed area. Further, the present invention provides the liquid composition having high storage stability, and stability in ejection through a recording head with excellent recording properties.

The present invention provides also an ink set comprising a liquid composition and a color ink, a method for formation of a colored area onto a recording medium and an ink jet recording apparatus to be capable of forming an ink-jet recorded image, in color ink-jet recording on a plain paper sheet, by keeping the texture of the plain paper sheet with coloring property and color uniformity comparable to that on ink-jet recording coat paper sheet with less stripy unevenness in a solid image with high rub-off resistance of the printed area. Further, the present invention provides the liquid composition having high storage stability, and stability in ejection through a recording head with excellent recording properties.

EXAMPLES

The present invention is described more concretely by EXAMPLES and COMPARATIVE EXAMPLES, wherein "parts" and "%" are based on weight, unless otherwise described.

Zeta potential in this specification was determined by a zeta potential analyzer (BI-ZETA plus; trade name; product of Brookhaven, liquid temperature: 20° C., acrylic cell) for the liquid composition prepared in such a way to disperse the fine solid particles to 0.1% with ion-exchanged water, pH was determined by a pH meter (Castanie pH meter D-14; trade name; product of Horiba Ltd.) at liquid temperature of 25° C., and average diameter of the fine particles was determined by a dynamic light-scattering type particle size distribution analyzer (BI-90; trade name; product of Brookhaven, liquid temperature: 20° C., acrylic cell) for the liquid composition prepared in such a way to disperse the fine solid particles to 0.1% with ion-exchanged water.

First, preparation of the liquid composition of the present invention is described.

The following components were mixed and dissolved, and then the mixture was passed through a membrane filter having a pore size of 1 $\mu$m (Fluoropore Filter; trade name; product of Sumitomo Electric Industries, Ltd.) under pressure, to prepare the liquid compositions A, B, C and D of the present invention.

<Composition of Liquid Composition A>

| | |
|---|---|
| Glycerin | 7.5% by weight |
| Diethylene glycol | 7.5% by weight |
| Alumina hydrate (average particle diameter: 0.17 $\mu$m) | 10.0% by weight |
| Nitric acid | 0.2% by weight |
| Water | 74.8% by weight |

The above alumina hydrate used was prepared by the following synthesis procedure:

(Synthesis Example of Alumina Hydrate)

Aluminum dodexide was prepared in accordance with the procedure disclosed by U.S. Pat. No. 4,242,271. The aluminum dodexide was then hydrolyzed in accordance with the procedure disclosed by U.S. Pat. No. 4,202,870, to prepare the alumina slurry. Water was added to the alumina slurry to have a solid alumina hydrate content of 7.9% by weight. The alumina slurry was at pH of 9.3. The pH level was adjusted with 3.9% nitric acid solution, to prepare the colloidal sol, which was spray-dried at 83° C. to prepare the alumina hydrate. This alumina hydrate was charged positive on the surface in water, to be cationic.

The liquid composition A thus prepared was at pH of 3.5 and had a zeta potential of +39 mV. It had good storage stability, because no sediment was observed while it was kept in an ink tank at 60° C. for 1 month in a dry atmosphere, and also it was stably ejected from the recording head.

<Composition of Liquid Composition B>

| | |
|---|---|
| Glycerin | 7.5% by weight |
| Diethylene glycol | 7.5% by weight |
| Colloidal silica (average particle diameter: 0.02 $\mu$m, Snowtex AK; trade name; product of Nissan Chemical Industries, Ltd.) | 10.0% by weight |
| Nitric acid | 0.6% by weight |
| Water | 74.4% by weight |

The above colloidal silica was surface treated to be cationic in water.

The liquid composition B thus prepared was at pH of 3.8 and had a zeta potential of +68 mV. It had good storage stability, because no sediment was observed while it was kept in an ink tank at 60° C. for 1 month in a dry atmosphere, and also it was stably ejected from the recording head.

<Composition of Liquid Composition C>

| | |
|---|---|
| Glycerin | 7.5% by weight |
| Diethylene glycol | 7.5% by weight |
| Colloidal zirconia (average particle diameter: 0.10 $\mu$m, $ZrO_2$ sol; trade name; product of Dai-ichi Kigenso Kagaku Kogyo) | 10.0% by weight |
| Nitric acid | 0.6% by weight |
| Water | 74.4% by weight |

The above zirconia was charged positive on the surface in water, to be cationic.

The liquid composition C thus prepared was at pH of 3.1 and had a zeta potential of +82 mV. It had good storage stability, because no sediment was observed while it was kept in an ink tank at 60° C. for 1 month in a dry atmosphere, and also it was stably ejected from the recording head.

<Composition of Liquid Composition D>

| | |
|---|---|
| Glycerin | 7.5% by weight |
| Diethylene glycol | 7.5% by weight |
| Fine polyurethane particle (average particle diameter: 0.45 μm, Permalin UC-20; trade name; product of Sanyo Chemical Industries) | 10.0% by weight |
| Acetic acid | 0.1% by weight |
| Water | 74.9% by weight |

The above fine polyurethane particle was surface treated to be cationic in water.

The liquid composition D thus prepared was at pH of 5.2 and had a zeta potential of +12 mV. It had good storage stability, because no sediment was observed while it was kept in an ink tank at 60° C. for 1 month in a dry atmosphere, and also it was stably ejected from the recording head.

<Composition of Liquid Composition E>

The liquid composition E was prepared in the same manner as that for the liquid composition A except that the alumina hydrate and water contents were set at 3.0 and 81.8% by weight, respectively.

The liquid composition E thus prepared was at pH of 3.5 and had a zeta potential of +42 mV. It had good storage stability, because no sediment was observed while it was kept in an ink tank at 60° C. for 1 month in a dry atmosphere, and also it was stably ejected from the recording head.

<Composition of Liquid Composition F>

The following components were mixed and dissolved, and then the mixture was passed through a membrane filter having a pore size of 1 μm (Fluoropore Filter; trade name, product of Sumitomo Electric Industries, Ltd.) under pressure, to prepare the liquid composition F to be used for the present invention.

| | |
|---|---|
| Glycerin | 7.5% by weight |
| Diethylene glycol | 7.5% by weight |
| Alumina hydrate (average particle diameter: 0.08 μm) | 10.0% by weight |
| Nitric acid | 0.2% by weight |
| Water | 74.8% by weight |

The above alumina hydrate used was prepared by the following synthesis procedure:

(Synthesis Example of Alumina Hydrate)

Aluminum dodexide was prepared in accordance with the procedure disclosed by U.S. Pat. No. 4,242,271. The aluminum dodexide was then hydrolyzed in accordance with the procedure disclosed by U.S. Pat. No. 4,202,870, to prepare the alumina slurry. Water was added to the alumina slurry to have a solid alumina hydrate content of 7.9% by weight. The alumina slurry was at pH of 9.3. The pH level was adjusted with 3.9% nitric acid solution, to prepare the colloidal sol, which was spray-dried at 83° C. to prepare the alumina hydrate. This alumina hydrate was charged positive on the surface in water, to be cationic.

The liquid composition F thus prepared was at pH of 3.5 and had a zeta potential of +39 mV. It had good storage stability, because no sediment was observed while it was kept in an ink tank at 60° C. for 1 month in a dry atmosphere, and also it was stably ejected from the recording head.

Next, preparation of the ink subsets 1 to 4 to be used for EXAMPLES of the present invention and COMPARATIVE EXAMPLES is described.

<Preparation of the Ink Subset 1>

Mixture of the following compositions, with each component well agitated and dissolved, were passed through a membrane filter having a pore size of 0.45 μm (Fluoropore Filter; trade name; product of Sumitomo Electric Industries, Ltd.) under pressure, to prepare the color inks, i.e., black (Bk1), yellow (Y1), magenta (M1) and cyan (C1), and the ink subset 1 composed of these color inks.

| [Black ink Bk1] | |
|---|---|
| C.I. direct black 195 | 2.5% by weight |
| 2-Pyrrolidone | 10% by weight |
| Glycerin | 5% by weight |
| Isopropyl alcohol | 4% by weight |
| Sodium hydroxide | 0.4% by weight |
| Water | 78.1% by weight |
| [Yellow ink Y1] | |
| Project Fast Yellow 2 (Zeneca Ltd.) | 2.0% by weight |
| C.I. direct yellow 86 | 1.0% by weight |
| Thiodiglycol | 8% by weight |
| Ethylene glycol | 8% by weight |
| Acetylenol EH (Kawaken Chemicals) | 0.2% by weight |
| Isopropyl alcohol | 4% by weight |
| Water | 76.8% by weight |
| [Magenta ink M1] | |
| Project Fast Magenta 2 (Zeneca Ltd.) | 3% by weight |
| Glycerin | 7% by weight |
| Urea | 7% by weight |
| Acetylenol EH (Kawaken Chemicals) | 0.2% by weight |
| Isopropyl alcohol | 4% by weight |
| Water | 78.8% by weight |
| [Cyan ink C1] | |
| C.I. direct blue 199 | 3% by weight |
| Ethylene glycol | 7% by weight |
| Diethylene glycol | 40% by weight |
| Acetylenol EH (Kawaken Chemicals) | 0.3% by weight |
| Water | 79.7% by weight |

<Preparation of the Ink Subset 2>

The pigment dispersion of the following composition was prepared, and used to prepare the black ink (Bk2). The similar pigment dispersions were used to prepare the yellow (Y2), magenta (M2) and cyan (C2) inks, and the ink subset 2 composed of these color inks.

[Black Ink Bk2]

(Preparation of Pigment Dispersion)

| | |
|---|---|
| Styrene-acrylic acid-ethyl acrylate copolymer (acid value: 140, weight-average molecular weight: 5,000) | 1.5% by weight |
| Monoethanolamine | 1.0% by weight |
| Diethylene glycol | 5.0% by weight |
| Ion-exchanged water | 81.5% by weight |

The above composition was mixed and heated at 70° C. by a water bath, to completely dissolve the resin component. To this solution, 10 parts of carbon black (MCF88, Mitsubishi Chemical) newly prepared and 1 part of isopropyl alcohol were added. The mixture was premixed for 30 minutes, and then dispersion-treated under the following conditions:

Dispersing machine: Sand grinder
   (Igarashi Kikai)

Grinding medium: Zirconium beads
   (diameter: 1 mm)

Packing ratio of the grinding medium: 50% (by volume)

Grinding time: 3 hours

The mixture was further treated centrifugally (12,000 rpm, 20 minutes), to remove the coarse particles and prepare the dispersion.

(Preparation of the Black Ink Bk2)

The above pigment dispersion was used and the following components were mixed in the composition ratio mentioned below to prepare the pigment-containing black ink Bk2:

| The above pigment dispersion | 30.0% by weight |
|---|---|
| Glycerin | 10.0% by weight |
| Ethylene glycol | 5.0% by weight |
| N-methyl pyrrolidone | 5.0% by weight |
| Ethyl alcohol | 2.0% by weight |
| Ion-exchanged water | 48.0% by weight |

[Yellow Ink Y2]

The pigment-containing yellow ink Y2 was prepared in the same manner as that for the black ink Bk2 except that 10 parts of the carbon black (MCF88, Mitsubishi Chemical) used therein was replaced by Pigment Yellow 74.

[Magenta Ink M2]

The pigment-containing magenta ink M2 was prepared in the same manner as that for the black ink Bk2 except that 10 parts of the carbon black (MCF88, Mitsubishi Chemical) used therein was replaced by Pigment Red 7.

[Cyan Ink C2]

The pigment-containing cyan ink C2 was prepared in the same manner as that for the black ink Bk2 except that 10 parts of the carbon black (MCF88, Mitsubishi Chemical) used therein was replaced by Pigment Blue 15.

<Preparation of the Ink Subset 3>

The ink subset 3 was prepared in the same manner as that for the ink subset 1 except that the black ink Bk1 was replaced by the black ink Bk3 composed of the following composition:

| [Black ink BK3] | |
|---|---|
| C.I. direct black 195 | 3% by weight |
| 2-Pyrrolidone | 10% by weight |
| Glycerin | 5% by weight |
| Isopropyl alcohol | 4% by weight |
| Sodium hydroxide | 0.4% by weight |
| Water | 77.6% by weight |

<Preparation of the Ink Subset 4 (Dye-based)>

Mixture of the following compositions, with each component well agitated and dissolved, were passed through a membrane filter having a pore size of 0.45 μm (Fluoropore Filter; trade name; product of Sumitomo Electric Industries, Ltd.) under pressure, to prepare the color inks, i.e., black (Bk4), yellow (Y3), magenta (M3) and cyan (C3), and the ink subset 4 composed of se color inks.

| [Black ink Bk4] | |
|---|---|
| C.I. direct black 195 | 0.3% by weight |
| 2-Pyrrolidone | 10% by weight |
| Glycerin | 5% by weight |
| Isopropyl alcohol | 4% by weight |
| Sodium hydroxide | 0.4% by weight |
| Water | 80.3% by weight |

| [Yellow ink Y3] | |
|---|---|
| Project Fast Yellow 2 (Zeneca) | 0.2% by weight |
| C.I. direct yellow 86 | 0.1% by weight |
| Thiodiglycol | 8% by weight |
| Ethylene glycol | 8% by weight |
| Acetylenol EH (Kawaken Chemicals) | 0.2% by weight |
| Isopropyl alcohol | 4% by weight |
| Water | 79.5% by weight |

| [Magenta ink M3] | |
|---|---|
| Project Fast Magenta 2 (Zeneca) | 0.3% by weight |
| Glycerin | 7% by weight |
| Urea | 7% by weight |
| Acetylenol EH (Kawaken Chemicals) | 0.2% by weight |
| Isopropyl alcohol | 4% by weight |
| Water | 81.5% by weight |

| [Cyan ink C3] | |
|---|---|
| C.I. direct blue 199 | 0.3% by weight |
| Ethylene glycol | 7% by weight |
| Diethylene glycol | 10% by weight |
| Acetylenol EH (Kawaken Chemicals) | 0.3% by weight |
| Water | 82.4% by weight |

<Preparation of the Ink Subset 5 (Pigment-based)>

The pigment dispersion of the following composition was prepared, and used to prepare the black ink (Bk9). The similar pigment dispersions were used to prepare the yellow (Y4), magenta (M4) and cyan (C4) inks, and the ink subset 5 composed of these color inks.

(Preparation of Pigment Dispersion)

| Styrene-acrylic acid-ethyl acrylate copolymer (acid value: 140, weight-average molecular weight: 5,000) | 1.5% by weight |
|---|---|
| Monoethanolamine | 1.0% by weight |
| Diethylene glycol | 5.0% by weight |
| Ion-exchanged water | 90.5% by weight |

The above composition was mixed and heated at 70° C. by a water bath, to completely dissolve the resin component. To this solution, 1 part of carbon black (MCF88, Mitsubishi Chemical) newly prepared and 1 part of isopropyl alcohol were added. The mixture was premixed for 30 minutes, and then dispersion-treated under the same conditions as those for the black ink Bk2:

[Black Ink Bk9]

The above dispersion was used and the following components were mixed in the composition ratio mentioned below to prepare the pigment-containing black ink Bk9:

| The above pigment dispersion | 10.0% by weight |
|---|---|
| Glycerin | 10.0% by weight |
| Ethylene glycol | 5.0% by weight |
| N-methyl pyrrolidone | 5.0% by weight |
| Ethyl alcohol | 2.0% by weight |
| Ion-exchanged water | 68.0% by weight |

[Yellow Ink Y4]

The pigment-containing yellow ink Y4 was prepared in the same manner as that for the black ink Bk9 except that 1 part of the carbon black (MCF88, Mitsubishi Chemical) used therein was replaced by Pigment Yellow 74.

[Magenta Ink M41]

The pigment-containing magenta ink M4 was prepared in the same manner as that for the black ink Bk9 except that 1 part of the carbon black (MCF88, Mitsubishi Chemical) used therein was replaced by Pigment Red 7.

[Cyan Ink C4]

The pigment-containing cyan ink C4 was prepared in the same manner as that for the black ink Bk9 except that 1 part of the carbon black (MCF88, Mitsubishi Chemical) used therein was replaced by Pigment Blue 15.

Examples 1 to 8

Recording was carried out by using liquid composition A, B, C and D of the present invention and ink subset 1 (Bk1, Y1, M1 and C1) and 2 (Bk2, Y2, M2 and C2), prepared in accordance with the procedures described above, in combination shown in Table 1 to obtain images. These combinations constitute EXAMPLES 1 to 8 of the present invention.

TABLE 1

| EXAMPLES | Ink subsets | Liquid compositions | | | Fine particles | |
| | | Types | pH | Zeta potential (mV) | Types | Average diameter ($\mu$m) |
| --- | --- | --- | --- | --- | --- | --- |
| 1 | 1 (dye-based) | A | 3.5 | +39 | Alumina hydrate | 0.17 |
| 2 | 1 (dye-based) | B | 3.8 | +68 | Colloidal silica | 0.02 |
| 3 | 1 (dye-based) | C | 3.1 | +82 | Colloidal zirconia | 0.10 |
| 4 | 1 (dye-based) | D | 5.2 | +12 | Polyurethane | 0.45 |
| 5 | 2 (pigment-based) | A | 3.5 | +39 | Alumina hydrate | 0.17 |
| 6 | 2 (pigment-based) | B | 3.8 | +68 | Colloidal silica | 0.02 |
| 7 | 2 (pigment-based) | C | 3.1 | +82 | Colloidai zirconia | 0.10 |
| 8 | 2 (pigment-based) | D | 5.2 | +12 | Polyurethane | 0.45 |

In the formation of coloring parts of EXAMPLES 1 to 8 by using combinations of the liquid compositions A to D and ink subsets 1 and 2 as mentioned above, recording was carried out on sheets of PPC paper (Canon). In these examples, the ink jet recording apparatus similar to that shown in FIG. 4 was used and the color image was formed by using 5 recording heads shown in FIG. 8. Liquid compositions were firstly applied onto the recording paper and subsequently, inks were applied. More concretely, a printing area was scanned three times for printing, i.e. three-pass fine printing mode being employed. In each pass, the liquid composition was applied to pixel positions to which any of the yellow, magenta, cyan and black inks was to be applied. In other words, the logical sum of printing data for yellow, magenta, cyan and black in each pass was used as printing data for the liquid composition. Various fine masks for the fine printing known in the art can be used without any particular limitations for fine printing and therefore, detailed description of those fine masks are omitted here.

The recording heads used in these examples had a recording density of 600 dpi, and were driven at a driving frequency of 9.6 kHz. Ejection amounts per one dot at the time of using the head at 600 dpi were 5 ng for the yellow, magenta and cyan inks and liquid composition while 30 ng per one dot for the black ink.

These recording conditions were common to EXAMPLES and COMPARATIVE EXAMPLES.

COMPARATIVE EXAMPLES

Comparative Examples 1 and 2

Recording was carried out by using the ink subsets 1 and 2 under the conditions shown in Table 2.

TABLE 2

| COMPARATIVE EXAMPLE | Ink subset | Liquid composition |
| --- | --- | --- |
| 1 | 1 (dye-based) | No |
| 2 | 2 (pigment-based) | No |

The recording heads in COMPARATIVE EXAMPLES 1 and 2 only using the ink subset 1 or 2 had a recording density of 600 dpi and were driven at a driving frequency of 9.6 kHz. Ejection amount per one dot at the time of using the recording head of 600 dpi were about 15 ng for the yellow, magenta and cyan inks while about 30 ng for the black ink. Thus, recording was carried out under the same conditions as those for EXAMPLES 1 to 8.

[Evaluation Methods and Standards]

The images recorded in each of EXAMPLES 1 to 6 and COMPARATIVE EXAMPLES 1 and 2 were evaluated by the following method and standards. The results are listed in Table 3.

(Method for Evaluation of Recorded Images)

(1) Coloring Property

The RGB color charts of Standard High Precision Picture data (SHIPP, including XYZ/CIELAB/RGB digital color chart data, supervised by the Committee for Preparation of Standard High Precision Images, issued by the Institute of Image Electronics Engineers of Japan) were printed by using a printer, and these color charts were measured. The coloring property was evaluated by calculating the three-dimensional breadth of color distribution (hereinafter referred to as "color gamut volume") in accordance with the method described in the technical manual of SHIPP and comparing those values. Printed images were obtained under the same image processing conditions and the colorimetric measurement was conducted at 24 hours after printing the image by using a GRETAG Spectrolino spectrophotometer provided with D50 as a light source at a field of view of 2°. The evaluation standards are shown below. The ratio of the color gamut volume with reference to the case of printing using only the ink subset (i.e., the image recorded in COMPARATIVE EXAMPLE 1 or 2) was adopted as a parameter for evaluation.

| Level | Color Gamut Volume Ratio |
|---|---|
| AA | not less than 1.4 |
| A | not less than 1.2 but less than 1.4 |
| B | not less than 1.0 but less than 1.2 |
| C | less than 1.0 |

The image was separately recorded on coated paper for ink jet (LC-101 for Color BJ Paper; trade name; product of Canon Inc.) by using the ink subset 1. It had a 1.3 times larger color gamut volume than that recorded in COMPARATIVE EXAMPLE 1.

(2) Uniformity

The solid images were printed with each of the yellow, magenta, cyan and black inks by using the above-described printer, and the color uniformity was evaluated by visual observation as to white fog and color unevenness. A color especially lacking color uniformity was evaluated. The evaluation standards are shown below:

A: Essentially no white fog or color unevenness is observed.

B: White fog or color unevenness is slightly observed along the fibers of paper, to an extent not to cause practical problem.

C: White fog or color unevenness is significantly observed along the fibers of paper.

(3) Stripy Unevenness

The solid images were printed with each of the yellow, magenta, cyan and black inks by using the above-described printer, and the stripy unevenness was evaluated by visual observation. A color especially lacking stripy uniformity was evaluated. The evaluation standards are shown below:

A: Essentially no stripy unevenness is observed.

B: Stripy unevenness is slightly observed at each head scan, to an extent not to cause practical problem.

C: Stripy unevenness is significantly observed at each head scan.

(4) Rub-off Resistance

The solid images were printed with each of the yellow, magenta, cyan and black inks by using the above-described printer. A Silbon paper was placed on the printed portion 16 hours after the images were printed, and drawn Silbon paper at 15 cm/sec on the image, while it was pressed by a weight (3.5 by 3.5 cm) placed thereon at a pressure of 40 g/cm$^3$, to evaluate rub-off resistance of the printed portion. A color especially low in rub-off resistance was evaluated. The evaluation standards are shown below:

A: Essentially no drop-off of the ink is observed.

B: The ink is slightly adhered to the Silbon paper, but drop-off of the ink in the printed portion was not significant.

C: The ink is significantly adhered to the Silbon paper, apparently causing drop-off of the ink in the printed portion.

(5) Texture

The solid images were printed with each of the yellow, magenta, cyan and black inks by using the above-described printer, and visually observed for texture of the recording medium. The evaluation standards are shown below:

A: No difference is observed between the printed and unprinted sections, and texture of the plain paper was left.

B: Difference in texture is observed between the printed and unprinted sections, or the recording medium significantly differed as a whole in texture from the plain paper.

TABLE 3

| | Coloring property | Uniformity | Stripy unevenness | Rub-off Resistance | Texture |
|---|---|---|---|---|---|
| EXAMPLE 1 | AA | A | A | A | A |
| EXAMPLE 2 | A | A | A | A | A |
| EXAMPLE 3 | A | A | A | A | A |
| EXAMPLE 4 | A | A | A | A | A |
| EXAMPLE 5 | AA | A | A | A | A |
| EXAMPLE 6 | A | A | A | A | A |
| EXAMPLE 7 | A | A | A | A | A |
| EXAMPLE 8 | A | A | A | A | A |
| COMPARATIVE EXAMPLE 1 | B | C | A | A | A |
| COMPARATIVE EXAMPLE 2 | B | C | C | C | A |

Examples 9 to 15

By using the liquid composition A and the ink subset 1, the recording images of EXAMPLES 9 to 15 were formed by superimposed 4 color inks constituting the ink subset 1 and the liquid composition A on a total of 7 types of "plain paper" being sold under the trade names 1) to 7) shown below. These images were evaluated, based on the above-described evaluation standards. The results are listed in Table 4.

Recording Media
1) Canon, PB Paper
2) Canon, Brilliant White Paper
3) Union Camp, Great White Inkjet
4) Hammermill, Jet Print
5) Xerox, Xerox 4024
6Hewlett Packard, Bright White Inkjet Paper
7) Aussdat Ray, Rey Jet

TABLE 4

| EXAMPLES | Recording media | Coloring property | Uniformity | Stripy unevenness | Rub-off resistance | Texture |
|---|---|---|---|---|---|---|
| 9 | 1) | AA | A | A | A | A |
| 10 | 2) | AA | A | A | A | A |
| 11 | 3) | AA | A | A | A | A |
| 12 | 4) | AA | A | A | A | A |
| 13 | 5) | AA | A | A | A | A |
| 14 | 6) | AA | A | A | A | A |
| 15 | 7) | AA | A | A | A | A |

Examples 16 to 23

The recording was carried out by using Each of the liquid compositions A and E and each of the ink subsets 2 to 5 in accordance with the combination shown in Table 5. These combinations constitute EXAMPLES 16 to 23 of the present invention.

In the formation of coloring parts of EXAMPLES 16 to 23, recording was carried out on sheets of PPC paper (Canon). In these examples, the ink jet recording apparatus similar to that shown in FIG. 4 was used and the color image was formed by using 5 recording heads shown FIG. 8. Liquid compositions were firstly applied onto the recording paper and subsequently, inks were applied.

More concretely, a printing area was scanned three times for printing, i.e. three-pass fine printing mode being employed. In each pass, the liquid composition was applied to pixel positions to which any of the yellow, magenta, cyan and black inks was to be applied. In other words., the logical sum of printing data for yellow, magenta, cyan and black in each pass was used as printing data for the liquid composition. Various fine masks for the fine printing known in the art can be used without any particular limitations for fine printing and therefore, detailed description of those fine masks are omitted here.

The recording heads used in these examples had a recording density of 600 dpi, and were driven at a driving frequency of 9.6 kHz. Ejection amounts per one dot at the time of using the head at 600 dpi were 15 ng for the yellow, magenta and cyan inks and liquid composition while 30 ng per one dot for the black ink.

These recording conditions were common to EXAMPLES and COMPARATIVE EXAMPLES.

[Recording Conditions]

The recording was carried out by using each of the liquid compositions A and E and each ink for the ink subsets 1 to 5. The recording conditions are shown in Table 5.

(Weight Concentration of the Mixed Solution)

The solid images were recorded on a recording medium with a combination of the liquid composition and cyan (C) and black (Bk) inks for each EXAMPLE by using the printer, in such a way to have the images of the cyan and black inks adjacent to each other. Weight concentration of the mixture of these coloring materials and fine particles contained in the mixture in which the liquid composition was mixed with these inks in liquid state was determined from concentration of each liquid and quantity of the liquid applied.

(Coloring Materials/Fine Particles of the Mixed Liquid)

The black text was recorded for a combination of each EXAMPLE by using the printer, to determine weight ratio of the coloring materials to the fine particles (coloring materials/fine particles ratio) contained in the mixed liquid from concentration of each liquid and quantity of the liquid applied.

TABLE 5

Colored section forming conditions

| | | | Conditions of the mixed solution on the recording medium | | |
| | | | Weight concentration of the mixture (%) | | Coloring materials/ fine particles |
| EX-AMPLES | Ink subset | Liquid composition | Solid Bk image | Solid C image | ratio of the Bk text image |
| --- | --- | --- | --- | --- | --- |
| 16 | 3 (Dye-based) | A | 5.33 | 6.50 | 0.6 |
| 17 | 3 (Dye-based) | E | 3.00 | 3.00 | 2.0 |
| 18 | 4 (Dye-based) | A | 3.53 | 5.15 | 0.06 |

TABLE 5-continued

Colored section forming conditions

| | | | Conditions of the mixed solution on the recording medium | | |
| | | | Weight concentration of the mixture (%) | | Coloring materials/ fine particles |
| EX-AMPLES | Ink subset | Liquid composition | Solid Bk image | Solid C image | ratio of the Bk text image |
| --- | --- | --- | --- | --- | --- |
| 19 | 4 (Dye-based) | E | 1.20 | 1.65 | 0.2 |
| 20 | 2 (Pigment-based) | A | 5.33 | 6.50 | 0.6 |
| 21 | 2 (Pigment-based) | E | 3.00 | 3.00 | 2.0 |
| 22 | 5 (Pigment-based) | A | 3.40 | 5.05 | 0.02 |
| 23 | 5 (Pigment-based) | E | 1.07 | 1.55 | 0.067 |

[Evaluation Methods and Standards]

The images recorded in each of EXAMPLES 16 to 23 were evaluated for coloring property, bleeding, thickened letters, uniformity, stripy unevenness, rub-off resistance and texture. Coloring property, uniformity, stripy unevenness, rub-off resistance and texture were measured in accordance with the above-described standards. Bleeding and thickened letters were measured by the following methods based on the following standards. The results are listed in Table 6.

(Method for Evaluating Recorded Images)

Bleeding

Solid images in each color of the cyan and black inks were printed adjacent to each other by using the printer, and the degree of bleeding was evaluated by visual observation at the borders of the colors. The evaluation standards are shown below:

A: No bleeding is observed visually.

B: Bleeding is observed to an inconspicuous extent.

C: Bleeding is observed to an extent not to cause practical problem.

D: Bleeding is observed to an extent to make the borders of the colors unclear.

Thickened Letters

The black text was printed by using a printer, and the letters were visually observed for thickened degree. The evaluation standards are shown below:

A: The text is sharply reproduced, showing essentially no thickened letters.

B: Slightly thickened letters are observed to an extent not to cause practical problem.

C: Thickened letters are observed to an extent exceeding the above.

TABLE 6

| EXAMPLES | Coloring property | Bleeding | Thickened letters | Uniformity | Stripy unevenness | Rub-off Resistance | Texture |
|---|---|---|---|---|---|---|---|
| 16 | AA | A | A | A | A | A | A |
| 17 | A | A | A | A | A | A | A |
| 18 | AA | A | A | A | A | A | A |
| 19 | AA | A | A | A | A | A | A |
| 20 | AA | A | A | A | A | A | A |
| 21 | A | A | A | A | A | A | A |
| 22 | AA | A | A | A | A | A | A |
| 23 | AA | A | A | A | A | A | A |

Next, preparation of the inks used for EXAMPLES and COMPARATIVE EXAMPLES is described.

Anionic, Dye-based Inks

<Black Ink>

The black inks Bk5 to Bk7 of the following compositions were prepared, with the composition below used as the base.

| (Black ink base) | |
|---|---|
| C.I. direct black 195 | 2.5% by weight |
| 2-Pyrrolidone | 10% by weight |
| Glycerin | 5% by weight |
| Isopropyl alcohol | 4% by weight |
| (Black ink Bk5) | |
| The above base | 21.5% by weight |
| Water | 78.5% by weight |
| (Black ink Bk6) | |
| The above base | 21.5% by weight |
| Sodium hydroxide | 2% by weight |
| Water | 76.5% by weight |
| (Black ink Bk7) | |
| The above base | 21.5% by weight |
| Lithium hydroxide | 0.4% by weight |
| Arginine | 5% by weight |
| Water | 73.1% by weight |

<Cyan Ink>

The cyan inks C5 to C7 of the following compositions were prepared, with the composition below used as the base.

| (Cyan ink base) | |
|---|---|
| Glycerin | 7% by weight |
| Triethylene glycol | 10% by weight |
| Hexylene glycol | 5% by weight |
| DBL199 | 3% by weight |
| Acetylenol EH (Kawaken Chemicals) | 1% by weight |
| (Cyan ink C5) | |
| The above base | 26% by weight |
| Water | 74% by weight |
| (Cyan ink C6) | |
| The above base | 26% by weight |
| Sodium hydroxide | 2% by weight |
| Water | 72% by weight |
| (Cyan ink C7) | |
| The above base | 26% by weight |
| Sodium hydroxide | 0.3% by weight |
| Arginine | 5% by weight |
| Water | 68.7% by weight |

<Magenta Ink>

The magenta inks M5 to M7 of the following compositions were prepared, with the composition below used as the base.

| (Magenta ink base) | |
|---|---|
| Triethylene glycol | 10% by weight |
| Urea | 10% by weight |
| Isopropyl alcohol | 4% by weight |
| IJR016 | 3% by weight |
| Acetylenol EH (Kawaken Chemicals) | 1% by weight |
| (Magenta ink M5) | |
| The above base | 28% by weight |
| Water | 72% by weight |
| (Magenta ink M6) | |
| The above base | 28% by weight |
| Sodium hydroxide | 2% by weight |
| Water | 70% by weight |
| (Magenta ink M7) | |
| The above base | 28% by weight |
| Ammonia | 2.5% by weight |
| Sodium hydroxide | 0.4% by weight |
| Water | 69.1% by weight |

<Yellow Ink>

The yellow inks Y5 to Y7 of the following compositions were prepared, with the composition below used as the base.

| (Yellow ink base) | |
|---|---|
| Glycerin | 5% by weight |
| 2-Pyrrolidone | 10% by weight |
| Isopropyl alcohol | 4% by weight |
| AY 23 | 3% by weight |
| Acetylenol EH (Kawaken Chemicals) | 1% by weight |
| (Yellow ink Y5) | |
| The above base | 23% by weight |
| Water | 77% by weight |
| (Yellow ink Y6) | |
| The above base | 23% by weight |
| Lithium hydroxide | 3% by weight |
| Water | 74% by weight |
| (Yellow ink Y7) | |
| The above base | 23% by weight |
| Lysine | 6% by weight |
| Water | 71% by weight |

Anionic, Pigment-based Inks

The pigment dispersion of the following composition was prepared, and used to prepare the pigment-based black (Bk8), yellow (Y8), magenta (M8) and cyan (C8) inks.

(Preparation of Pigment Dispersion)

| | |
|---|---|
| Styrene-acrylic acid-ethyl acrylate copolymer (acid value: 140, weight-average molecular weight: 5,000) | 1.5% by weight |
| Monoethanolamine | 1.0% by weight |
| Diethylene glycol | 5.0% by weight |
| Ion-exchanged water | 81.5% by weight |

The above compositions were mixed and heated at 70° C. by a water bath, to completely dissolve the resin component. To this solution, 10 parts of carbon black (MCF88, Mitsubishi Chemical) newly prepared and 1 part of isopropyl alcohol were added. The mixture was premixed for 30 minutes, and then dispersion-treated under the following conditions:

Dispersing machine: Sand grinder
  (Igarashi Kikai)
Grinding medium: Zirconium beads
  (diameter: 1 mm)
Packing ratio of the grinding medium: 50%
  (by volume)
Grinding time: 3 hours The mixture was further treated centrifugally (12,000 rpm, 20 minutes), to remove the coarse particles and prepare the pigment dispersion.

(Preparation of the Black Ink Bk8)

The above pigment dispersion was used and the following components were mixed in the component ratio mentioned below to prepare the pigment-containing black ink Bk8:

| | |
|---|---|
| The above pigment dispersion | 30.0% by weight |
| Glycerin | 10.0% by weight |
| Ethylene glycol | 5.0% by weight |
| N-methyl pyrrolidone | 5.0% by weight |
| Ethyl alcohol | 2.0% by weight |
| Arginine | 3.0% by weight |
| Ion-exchanged water | 45.0% by weight |

[Cyan Ink C8]

The pigment-containing cyan ink C8 was prepared in the same manner as that for the black ink Bk8 except that 10 parts of the carbon black (MCF88, Mitsubishi Chemical) used therein was replaced by Pigment Blue 15.

[Magenta Ink M8]

The pigment-containing magenta ink M8 was prepared in the same manner as that for the black ink Bk8 except that 10 parts of the carbon black (MCF88, Mitsubishi Chemical) used therein was replaced by Pigment Red 7.

[Yellow Ink Y8]

The pigment-containing yellow ink Y8 was prepared in the same manner as that for the black ink Bk8 except that 10 parts of the carbon black (MCF88, Mitsubishi Chemical) used therein was replaced by Pigment Yellow 74.

<Preparation of Ink Subsets>

The ink subsets 6 to 10 were prepared by using the pigment-based black inks Bk2 and Bk5 to Bk8, cyan inks C2 and C5 to C8, magenta inks M2 and M5 to M8, and yellow inks Y2 and Y5 to Y8, prepared above, in accordance with the combinations shown in Table 7. The ink subsets 7 and 8 with reference to the ink subset 6, and the ink subset 10 with reference to the ink subset 9 were the formation incorporated with a basic material.

TABLE 7

| | Ink combinations | | | |
|---|---|---|---|---|
| Ink subsets | Black | Cyan | Magenta | Yellow |
| 6 | Bk5 | C5 | M5 | Y5 |
| 7 | Bk6 | C6 | M6 | Y6 |
| 8 | Bk7 | C7 | M7 | Y7 |
| 9 | Bk2 | C2 | M2 | Y2 |
| 10 | Bk8 | C8 | M8 | Y8 |

Examples 24 to 29, Reference Examples 1 to 6 and Comparative Examples 3 and 4

The recording was carried out by using Each of the liquid compositions F, C and D for the present invention, prepared above, and each of the ink subsets 6 to 10 in accordance with the combination shown in Table 8. These combinations constitute EXAMPLES 24 to 29 of the present invention, REFERENCE EXAMPLES 1 to 6, and COMPARATIVE EXAMPLES 3 and 4.

TABLE 8

| | Ink subsets | Liquid compositions |
|---|---|---|
| EXAMPLE 24-1 | 7 | F |
| EXAMPLE 24-2 | 8 | F |
| EXAMPLE 25-1 | 7 | C |
| EXAMPLE 25-2 | 8 | C |
| EXAMPLE 26-1 | 7 | D |
| EXAMPLE 26-2 | 8 | D |
| EXAMPLE 27 | 10 | F |
| EXAMPLE 28 | 10 | C |
| EXAMPLE 29 | 10 | D |
| REFERENCE EXAMPLE 1 | 6 | F |
| REFERENCE EXAMPLE 2 | 6 | C |
| REFERENCE EXAMPLE 3 | 6 | D |
| REFERENCE EXAMPLE 4 | 9 | F |
| REFERENCE EXAMPLE 5 | 9 | C |
| REFERENCE EXAMPLE 6 | 9 | D |
| COMPARATIVE EXAMPLE 3 | 6 | None |
| COMPARATIVE EXAMPLE 4 | 9 | None |

In the formation of coloring parts of EXAMPLES 24 to 29, REFERENCE EXAMPLES 1 to 6 and COMPARATIVE EXAMPLES 3 and 4 by using the combination of the liquid compositions B, C and F and the ink subsets 6 to 10 mentioned above, recording was carried out on sheets of PPC paper (Canon). In these examples, the ink jet recording apparatus similar to that shown in FIG. 4 was used and the color image was formed by using 5 recording heads shown in FIG. 8. Liquid compositions were first applied onto the recording paper and subsequently, inks were applied. More concretely, a printing area was scanned three times for printing, i.e., a three-pass fine printing mode was employed. In each pass, the liquid composition was applied to pixel positions to which any of the yellow, magenta, cyan and black inks was to be applied. In other words, the logical sum of printing data for yellow, magenta, cyan and black in each pass was used as printing data for the liquid composition. Various fine masks for the fine printing known in the art can be used without any particular limitations for fine printing and therefore, detailed descriptions of those fine masks are omitted here.

The recording heads used in these examples had a recording density of 600 dpi, and were driven at a driving frequency of 9.6 kHz. Ejection amounts per one dot at the time of using the head at 600 dpi were 15 ng for the yellow, magenta and cyan inks and liquid composition while 30 ng per one dot for the black ink.

[Evaluation Methods and Standards]

The images recorded in each of EXAMPLES 24 to 29, REFERENCE EXAMPLES 1 to 6, and COMPARATIVE EXAMPLES 3 and 4 were evaluated for coloring property, uniformity, stripy unevenness, rub-off resistance and texture. Coloring property was evaluated by the following method and standards, and the other items were evaluated by the methods and standards similar to those described above. The results are listed in Table 9.

Coloring Property

The RGB color charts of Standard High Precision Picture data (SHIPP, including XYZ/CIELAB/RGB digital color chart data, supervised by the Committee for Preparation of Standard High Precision Images, issued by the Institute of Image Electronics Engineers of Japan) were printed by using a printer, and these color charts were measured. The coloring property was evaluated by calculating the three-dimensional breadth of color distribution (hereinafter referred to as "color gamut volume") in accordance with the method described in the technical manual of SHIPP and comparing those values. Printed images were obtained under the same image processing conditions and the colorimetric measurement was conducted at 24 hours after printing the image by using a GRETAG Spectrolino spectrophotometer provided with D50 as a light source at a field of view of 2°. The evaluation standards are shown below. In EXAMPLES and REFERENCE EXAMPLES, by using the same liquid composition, the ratio of the color gamut volume of the ink subset 6 with reference to the ink subsets 7 and 8, and of the ink subset 10 with reference to the ink subset 9 was adopted as a parameter for evaluation. The results are listed in Table 9.

○: The color gamut volume ratio is larger than 1.0 (increased color gamut volume)

X: The color gamut volume ratio is not more than 1.0 (color gamut volume not increased)

TABLE 9

| | Coloring property | Uniformity | Stripy unevenness | Rub-off resistance | Texture |
|---|---|---|---|---|---|
| EXAMPLE 24-1 | ○ | A | A | A | A |
| EXAMPLE 24-2 | ○ | A | A | A | A |
| EXAMPLE 25-1 | ○ | A | A | A | A |
| EXAMPLE 25-2 | ○ | A | A | A | A |
| EXAMPLE 26-1 | ○ | A | A | A | A |
| EXAMPLE 26-2 | ○ | A | A | A | A |
| EXAMPLE 27 | ○ | A | A | A | A |
| EXAMPLE 28 | ○ | A | A | A | A |
| EXAMPLE 29 | ○ | A | A | A | A |
| REFERENCE EXAMPLE 1 | — | A | A | A | A |
| REFERENCE EXAMPLE 2 | — | A | A | A | A |
| REFERENCE EXAMPLE 3 | — | A | A | A | A |
| REFERENCE EXAMPLE 4 | — | A | A | A | A |
| REFERENCE EXAMPLE 5 | — | A | A | A | A |
| REFERENCE EXAMPLE 6 | — | A | A | A | A |
| COMPARATIVE EXAMPLE 3 | — | C | A | A | A |
| COMPARATIVE EXAMPLE 4 | — | C | A | C | A |

What is claimed is:

1. An aqueous liquid composition for forming a colored area of an image on a recording medium by application with an anionic or cationic aqueous ink, containing a coloring material, the aqueous composition containing fine particles dispersed therein and the fine particles being charged at a surface in a polarity opposite to the aqueous ink, wherein the fine particles adsorb the coloring material of the ink in a monomolecular state on the surface of the fine particles when forming the colored area.

2. An aqueous liquid composition for forming a colored area of an image on a recording medium by application with an anionic or cationic aqueous ink, containing a coloring material, the aqueous composition containing fine particles dispersed therein and the fine particles being charged at a surface in a polarity opposite to the aqueous ink, wherein the liquid composition has a zeta potential ranging from +5 mV to +90 mV.

3. An aqueous liquid composition for forming a colored area of an image on a recording medium by application with an anionic or cationic aqueous ink, containing a coloring material, the aqueous composition containing fine particles dispersed therein and the fine particles being charged at a surface in a polarity opposite to the aqueous ink, wherein the liquid composition contains an acid, and the pH is adjusted to be in the range from 2 to 7, and wherein the acid has a primary dissociation constant pKa of not higher than 5 in water.

4. An aqueous liquid composition for forming a colored area of an image on a recording medium by application with an anionic or cationic aqueous ink, containing a coloring material, the aqueous composition containing fine particles dispersed therein and the fine particles being charged at a surface in a polarity opposite to the aqueous ink, wherein the liquid composition has a zeta potential ranging from −5 mV to −90 mV.

5. An aqueous liquid composition for forming a colored area of an image on a recording medium by application with an anionic or cationic aqueous ink, containing a coloring material, the aqueous composition containing fine particles dispersed therein and the fine particles being charged at a surface in a polarity opposite to the aqueous ink, wherein the liquid composition contains a base, and is adjusted to have a pH in the range from 7 to 12, and wherein the base has a primary dissociation constant pKb of not higher than 5 in water.

6. The liquid composition according to claim 3, wherein the fine particles in the liquid composition have an average particle diameter ranging from 0.005 $\mu$m to 1 $\mu$m.

7. An ink set comprising an aqueous anionic or cationic ink containing a coloring material and an aqueous liquid composition, the liquid composition containing fine particles dispersed therein and being charged at a surface in a polarity opposite to the ink, wherein the fine particles adsorb the coloring material of the ink in a monomolecular state on the surface of the fine particles when the ink and the liquid composition are brought into contact with each other in a liquid-liquid state.

8. The ink set according to claim 7, wherein the aqueous ink is at least one selected from a yellow ink, a magenta ink, a cyan ink, a black ink, a red ink, a blue ink and a green ink.

9. An ink set comprising an aqueous anionic or cationic ink containing a coloring material and an aqueous liquid composition, the liquid composition containing fine particles dispersed therein and being charged at a surface in a polarity opposite to the ink, wherein the aqueous ink is anionic, and the liquid composition has a zeta potential ranging from +5 mV to +90 mV.

10. The ink set according to claim 9, wherein the anionic aqueous ink contains a basic substance.

11. The ink set according to claim 7, wherein the aqueous ink has a buffer capacity for a hydrogen ion concentration.

12. An ink set comprising an aqueous anionic or cationic ink containing a coloring material and an aqueous liquid composition, the liquid composition containing fine particles dispersed therein and being charged at a surface in a polarity opposite to the ink, wherein the aqueous ink is anionic, and the liquid composition contains an acid and has a pH adjusted to be in the range from 2 to 7, and wherein the acid has a primary dissociation constant pKa of not higher than 5 in water.

13. An ink set comprising an aqueous anionic or cationic ink containing a coloring material and an aqueous liquid composition, the liquid composition containing fine particles dispersed therein and being charged at a surface in a polarity opposite to the ink, wherein the aqueous ink is cationic, and the liquid composition has a zeta potential ranging from –5 mV to –90 mV.

14. An ink set comprising an aqueous anionic or cationic ink containing a coloring material and an aqueous liquid composition, the liquid composition containing fine particles dispersed therein and being charged at a surface in a polarity opposite to the ink, wherein the aqueous ink is cationic, and the liquid composition contains a base, and is adjusted to have a pH in the range from 7 to 12, and wherein the base has a primary dissociation constant pKb of not higher than 5 in water.

15. The ink set according to claim 7, wherein the fine particles dispersed in the liquid composition have an average particle diameter ranging from 0.005 $\mu$m to 1 $\mu$m.

16. The ink set according to claim 7, wherein the aqueous ink is anionic and contains a water-soluble dye having an anionic group.

17. The ink set according to claim 7, wherein the aqueous ink is anionic and contains a pigment having an anionic group on the surface thereof.

18. The ink set according to claim 7, wherein the aqueous ink is anionic and contains a pigment and an anionic compound as a dispersant for the pigment.

19. The ink set according to claim 7, wherein the aqueous ink is cationic and contains a cationic compound.

20. A method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state, wherein the fine particles adsorb the coloring material of the ink in a monomolecular state on the surface of the fine particles when forming the colored area.

21. The method for forming a colored area of an image according to claim 20, wherein at least the step (ii) is conducted firstly and then the step (i) is conducted.

22. The method for forming a colored area of an image according to claim 20, wherein at least the step (i) is conducted firstly and then the step (ii) is conducted.

23. The method for forming a colored area of an image according to claim 20, wherein the step (i) is conducted firstly, then the step (ii) is conducted, and further the step (i) is again conducted.

24. The method for forming a colored area of an image according to claim 20, wherein the step (i) comprises a step of applying an aqueous ink onto a recording medium by an ink-jet recording system by ejecting the aqueous ink through an orifice in accordance with recording signals.

25. The method for forming a colored area of an image according to claim 24, wherein the ink-jet recording system ejects the ink by action of thermal energy.

26. The method for forming a colored area of an image according to claim 20, wherein the step (ii) comprises a step of applying a liquid composition onto a recording medium by an ink-jet recording system by ejecting the liquid composition through an orifice in accordance with recording signals.

27. The method for forming a colored area of an image according, to claim 26, wherein the ink-jet system ejects the liquid composition by action of thermal energy.

28. The method for forming a colored area of an image according to claim 20, wherein the total concentration of the fine particles of the liquid composition and the coloring material of the aqueous ink brought into contact on the recording medium is not lower than 0.5% by weight on mixing of on a recording medium based on the total weight of the applied liquid composition and the applied ink.

29. An ink-jet recording apparatus comprising a first recording unit having an ink container holding, an aqueous anionic or cationic ink containing a coloring material, and a first ink-jet head for ejecting the ink; and a second recording unit having a liquid composition container holding a liquid composition containing fine particles dispersed therein and electrically charged at the surface in a polarity opposite to the aqueous ink, and a second ink-jet head for ejecting the liquid composition, wherein the fine particles adsorb the coloring material of the ink in a monomolecular state on the surface of the fine particles when the ink and the liquid composition are brought into contact with each other in a liquid-liquid state.

30. An ink-jet recording apparatus comprising an ink container holding an aqueous anionic or cationic ink containing a coloring material, a liquid composition container holding a liquid composition containing fine particles dispersed therein and electrically charged at the surface in a polarity opposite to the aqueous ink, and an ink-jet head for ejecting separately the aqueous ink held in the ink container and the liquid composition held in the liquid composition container, wherein the fine particles adsorb the coloring material of the ink in a monomolecular state on the surface of the fine particles when the ink and the liquid composition are brought into contact with each other in a liquid-liquid state.

31. The ink-jet recording apparatus according to claim 29, wherein the ink-jet head is a thermal ink-jet head which ejects a liquid by action of a thermal energy.

32. The liquid composition according to claim 3, wherein the coloring material is in a mono-molecular state in the ink, the liquid composition comprising a fine particle, wherein the particle adsorbs or binds the coloring material on the surface thereof with substantially maintaining the monomolecular state to form the colored area when the ink and the liquid composition are brought into contact with each other in a liquid-liquid state.

33. A method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state, wherein the liquid composition has a zeta potential ranging from +5 mV to +90 mV.

34. A method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state, wherein the liquid composition contains an acid, and the pH is adjusted to be in the range from 2 to 7, and wherein the acid has a primary dissociation constant pKa of not higher than 5 in water.

35. A method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state, wherein the liquid composition has a zeta potential ranging from −5 mV to −90 mV.

36. A method for forming a colored area of an image comprising the steps of: (i) applying an aqueous anionic or cationic ink containing a coloring material onto a recording medium; and (ii) applying onto a recording medium a liquid composition containing fine particles dispersed therein and electrically charged at a surface in a polarity opposite to the ink, wherein the aqueous ink and the liquid composition are brought into contact in a liquid-liquid state, wherein the liquid composition contains a base, and is adjusted to have a pH in the range from 7 to 12, and wherein the base has a primary dissociation constant pKb of not higher than 5 in water.

37. An ink set comprising an aqueous ink containing a coloring material and an aqueous liquid composition, the liquid composition containing fine particles dispersed therein and being cationically charged at a surface, wherein the ink contains as the coloring material any one of the following compounds (i) to (iii):

(i) a water-soluble dye having an anionic group, (ii) a pigment and an anionic compound as a dispersant for the pigment, and (iii) a pigment having on a surface an anionic group bonded thereto directly or through a linking atomic group, and wherein the liquid composition is any one of the following liquid compositions (iv) to (vi):

(iv) a liquid composition containing such fine particles that the coloring material in the ink is adsorbed at the surface of the fine particles in a monomolecular state when the liquid composition comes into contact with the ink in a liquid-liquid state, (v) a liquid composition having a zeta potential ranging from +5 mV to +90 mV, and (vi) a liquid composition containing an acid having a primary dissociation constant pKa of not higher than 5 in water, and having a pH adjusted to be in the range from 2 to 7.

38. The ink set according to claim 37, wherein the fine particles in the liquid composition are of alumina hydrate.

39. Art ink set comprising an aqueous ink containing a coloring material and an aqueous liquid composition, the liquid composition containing fine particles dispersed therein and being anionically charged at a surface, wherein the ink contains as the coloring material any one of the following compounds (i) to (iii):

(i) a water-soluble dye having a cationic group, (ii) a pigment and an cationic compound as a dispersant for the pigment, and (iii) a pigment having on a surface a cationic group bonded thereto directly or through a linking atomic group, and wherein the liquid composition is any one of the following liquid compositions (iv) to (vi):

(iv) a liquid composition containing such line particles that the coloring material in the ink is adsorbed at the surface of the fine particles in a monomolecular state when the liquid composition comes into contact with the ink in a liquid-liquid state, (v) a liquid composition having a zeta potential ranging from −5 mV to −90 mV, and (vi) a liquid composition containing a base having a primary dissociation constant pKb of not higher than 5 in water, and having a pH adjusted to be in the range from 7 to 12.

40. The ink set according to claim 39, wherein the fine particles in the liquid composition are of alumina hydrate.

* * * * *

UNITED STATES PATENT AND TRADEMARK OFFICE
CERTIFICATE OF CORRECTION

PATENT NO. : 6,517,199 B1
DATED : February 11, 2003
INVENTOR(S) : Hiroshi Tomioka et al.

It is certified that error appears in the above-identified patent and that said Letters Patent is hereby corrected as shown below:

<u>Title page,</u>
Item [57], ABSTRACT,
Line 2, "compositions" should read -- composition, --.

<u>Column 1,</u>
Line 52, "may" should read -- many --.

<u>Column 19,</u>
Line 28, "of!the" should read -- of the --.

<u>Column 20,</u>
Line 33, "a anionic" should read -- an anionic --.

<u>Column 23,</u>
Line 40, "applies." should read -- applied. --.

<u>Column 24,</u>
Line 43, "bubble" should read -- bubbles --.

<u>Column 33,</u>
Line 58, "se" should read -- these --.

<u>Column 35,</u>
Line 1, "M41]" should read -- M4] --.

<u>Column 44,</u>
Line 15, "Each" should read -- each --.

UNITED STATES PATENT AND TRADEMARK OFFICE
CERTIFICATE OF CORRECTION

PATENT NO. : 6,517,199 B1
DATED : February 11, 2003
INVENTOR(S) : Hiroshi Tomioka et al.

It is certified that error appears in the above-identified patent and that said Letters Patent is hereby corrected as shown below:

<u>Column 48,</u>
Line 16, "according," should read -- according --.
Line 23, "of" should be deleted.
Line 26, "holding," should read -- holding --.

Signed and Sealed this

Sixteenth Day of December, 2003

JAMES E. ROGAN
*Director of the United States Patent and Trademark Office*